US 6,653,008 B1

(12) United States Patent  
Hirakata et al.

(10) Patent No.: US 6,653,008 B1
(45) Date of Patent: Nov. 25, 2003

(54) FUEL CELL APPARATUS

(75) Inventors: Syuji Hirakata, Susono (JP); Shin Nishida, Mishima (JP); Akira Aoto, Okazaki (JP); Toru Bisaka, Kariya (JP); Hideyuki Tanaka, Kariya (JP); Yutaka Hotta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 09/679,830

(22) Filed: Oct. 5, 2000

(30) Foreign Application Priority Data

| Oct. 8, 1999 | (JP) | ............................ 11-287517 |
| Nov. 25, 1999 | (JP) | ............................ 11-334100 |

(51) Int. Cl.⁷ ........................... H01M 8/02; H01M 8/04
(52) U.S. Cl. .............. 429/26; 429/34; 429/38
(58) Field of Search ........................ 429/26, 34, 38, 429/18

(56) References Cited

U.S. PATENT DOCUMENTS 3,964,929 A * 6/1976 Grevstad .................... 429/26
6,248,466 B1 * 6/2001 Takahashi et al. ........... 429/38

FOREIGN PATENT DOCUMENTS

| DE | 43 24 907 | 1/1995 |
| DE | 199 45 323 | 4/2000 |
| EP | 959511 A2 * | 11/1999 |
| JP | 5-14457 Y2 | 12/1985 |
| JP | 7-335243 | 12/1995 |
| JP | 8-162143 | 6/1996 |
| JP | 8-171926 | 7/1996 |
| JP | 11-204126 | 7/1999 |
| JP | 11-238522 | 8/1999 |

OTHER PUBLICATIONS

Patent Abstracts of Japan, JP 2000–100459, Apr. 7, 2000.

* cited by examiner

Primary Examiner—Randy Gulakowski
Assistant Examiner—Jonathan Crepeau
(74) Attorney, Agent, or Firm—Oblon, Spivak, McClelland, Maier & Neustadt, P.C.

(57) ABSTRACT

A fuel cell apparatus is formed by connecting four stacks via a supply/discharge box. A cooling water supply opening and a cooling water discharge opening are short-circuited by a cable so as to eliminate the electric potential difference therebetween. To avoid hindrance of gas flow due to water droplets, a drain port for discharging water droplets is provided near a fuel gas discharge opening of the supply/discharge box. Each stack is formed by clamping end plates disposed on opposite ends of stacked cells through the use of upper and lower tension plates. The thus-formed fuel cell apparatus is housed in an outer case that has a sealed construction for preventing penetration of foreign substances. Thus, the apparatus achieves a size reduction and an improvement in practicality.

10 Claims, 17 Drawing Sheets

FUEL CELL APPARATUS

INCORPORATION BY REFERENCE

The disclosures of Japanese Patent Application No. HEI 11-287517 filed on Oct. 8, 1999 and No. HEI 11-334100 filed on Nov. 25, 1999 including the specification, drawings and abstract are incorporated herein by reference in their entirety.

BACKGROUND OF THE INVENTION

1. Field of the Invention

The present invention relates to a fuel cell having an anode and a cathode that sandwich a hydrogen ion-permeable electrolyte layer and, more particularly, to a technology for reducing the size of a fuel cell stack.

2. Description of the Related Art

A fuel cell has an anode and a cathode that sandwich a hydrogen ion-permeable electrolyte layer, and generates an electromotive force by causing reactions as in equations (1), (2) on the anode and the cathode, respectively.
Anode:

$$H_2 \rightarrow 2H^+ + 2e^- \quad (1)$$

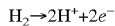

Cathode:

$$(1/2)O_2 + 2H^+ + 2e^{31} \rightarrow H_2O \quad (2)$$

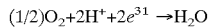

Various types of fuel cells based on different kinds of electrolyte layers, for example, a phosphoric acid fuel cell, a molten carbonate fuel cell, a electrolyte fuel cell, an alkaline fuel cell, etc., have been proposed. Recently, a polymer electrolyte fuel cell adopting a hydrogen ion-conductive polymer membrane as an electrolyte layer is receiving attention because of, for example, its high output density and size reduction potentiality. With regard to the polymer electrolyte fuel cells, various improvements have been and are being considered.

In any of the aforementioned types of fuel cells, the theoretical electromotive force per unit cell is about 1.23 V. Therefore, a desired voltage is achieved by stacking a plurality of cells. A unit formed by stacking cells and securing them through the use of a case is termed stack. In a typical stack, the cell stacking precision appears as an internal resistance. Therefore, if an extremely great number of cells are stacked, the internal resistance becomes large and the fuel cell efficiency decreases. Furthermore, stacking an extremely large number of cells makes it difficult to equally supply fuel gas to the cells. For these reasons, it is a normal practice to avoid constructing a fuel cell apparatus by using a single stack in which cells are stacked to a number that substantially achieves a desired voltage. Instead, plurality of divided fuel cell stacks are connected in series so as to achieve a desired voltage.

As a technology related to this invention, a fuel cell apparatus employing a plurality of stacks is proposed in Japanese Patent Application Laid-Open No. HEI 8-171926. This fuel cell apparatus is able to equally supply fuel to the individual stacks, and allows a size reduction of the entire apparatus. The fuel cell apparatus has a construction in which four stacks are connected via supply/discharge members.

However, it has been found that when fuel cell stacks are to be installed in various appliances, such as vehicles and the like, there are various problems as mentioned below, in addition to the problems in supplying and discharging fuel.

According to the conventional art, size reduction of fuel cells is not sufficiently considered in means for solving problems as mentioned above. Therefore, a solution to a problem as mentioned above often gives rise to a problem of a size increase of a fuel cell. In other words, preferable means for solving the below-mentioned problems haven not been thoroughly considered.

A first problem with the fuel cell stack is one attributed to cooling. Fuel cells are cooled by cooling water which flows in cooling water channels formed in each separator that defines gas channels of the corresponding cell. A typical separator is formed by an electrically conductive member. Therefore, due to contact with the electrically conductive separators during the process of cooling cells, cooling water is electrified in accordance with the electric potentials of the electrodes. In a construction having a water-supplying opening for supplying cooling water into a stack and a water-discharging opening for discharging cooling water from the stack, there is a potential difference near the openings. In such a case, the electric potential difference may cause detrimental effects such as galvanic corrosion at the water-supplying and water-discharging openings and the like.

To avoid such detrimental effects, it may be conceivable to, for example, cover the water-supplying and water-discharging openings with an electrically insulating material, or the like. However, this measure results in an increased size of the stack. Particularly in a construction in which a plurality of stacks are connected, the potential difference between the water-supplying and water-discharging openings is as high as several hundred volts. Therefore, in such a construction, it becomes necessary to increase the size of an insulating coating member, so that the effect of the insulating coating members on the size of the apparatus becomes great.

As another measure, it may be conceivable to provide a water-supplying opening and a water-discharging opening at a site where there is no electric potential difference. However, since this measure increases the restrictions regarding the sites of provision of the water-supplying and water-discharging openings, the freedom in designing cooling water channels decreases, thereby impeding the size reduction of the apparatus.

A second problem regarding the stack is attributed to the discharge of water produced by the reactions. As indicated in equations (1), (2), a fuel cell produces water ($H_2O$) through the reactions therein. Water produced in each cell is transported along with gas flows through a manifold for supplying gases to the stack, to a gas-discharging opening. In a polymer electrolyte fuel cell, water for moisturizing the electrolyte membranes is also transported to the gas-discharging opening via the same route as mentioned above. If the amount of water transported to the gas-discharging opening increases, a phenomenon generally termed flooding may occur, causing unstable operation of the fuel cell. More specifically, condensed water droplets formed within the gas-discharging opening reduce the sectional area of the gas-discharging opening and thereby impede gas flow, so that supply of gas to each cell is impeded. This results in unstable power generation.

To avoid such a problem, Japanese Patent Application Laid-Open No. HEI 11-204126 proposes a construction in which a stack is provided with a drain port. However, since this construction includes the drain port and a drain valve provided outside the stack, there is a problem of a great size increase of the stack construction and therefore a great size increase of the entire fuel cell construction. Furthermore, in a fuel cell construction having a plurality of stacks, it is necessary to provide drain mechanisms separately for the individual stacks, so that the size increase of the fuel cell construction becomes even greater.

A third problem regarding the stack is attributed to the cell insulating characteristic. A stack is formed by securing stacked cells in such a manner that the cells do not separate from one another in the stacking direction. An external structure for securing the cells is herein referred to as "stack case." Since the stacked cells are a set of electrodes, it is necessary to insulate the stack case and the stacked cells from each other if a stack is constructed as described above. In a stack related to this invention, an insulator, such as a silicone rubber or the like, is inserted between the stacked cells and the stack case to provide insulation therebetween. However, if the insulation between the stack case and the stacked cells is to be achieved by the above-described construction, the stack production process must include a step of inserting an insulator, so that productivity may decrease. Since in the process of forming a stack by stacking cells, precision related to internal resistance is required, the addition of the insulator inserting step greatly reduces the productivity in some cases. Furthermore, since insulators, such as a silicone rubber and the like, generally have relatively low precision with respect to the thickness thereof, it is necessary that when considering variations in the thickness of the insulator, the stack case be formed with increased dimensions, in order to construct a stack without causing unnecessary loads on the cells. Furthermore, since the insulator needs to have a certain thickness in order to maintain the configuration thereof, the insulator becomes inconveniently large, resulting in a size increase of the stack case.

As a technology for avoiding the aforementioned size increase, Japanese Patent Application Laid-Open No. HEI 8-162143 discloses a technology in which four side surfaces of a stack are coated by applying a rubber thereto. However, if this technology is employed to achieve insulation of a stack, the step of applying rubber must be added. Furthermore, should breakage or the like occur within a rubber-coated stack, repair will be difficult. In view of these circumstances, a technology for reliably insulating a stack and avoiding the size increase of the stack case without reducing the productivity of stacks has been demanded.

A fourth problem of the stack is attributed to securement of water-tightness, dust-tightness, and rigidity of the stack. In a stack, cells are fixed by a stack case as described above. However, it is often the case that the stack case is provided with a not-completely sealed structure in view of the need to mount a terminal for monitoring the voltage across the cells, the operability in mounting the terminal, etc. Therefore, if a stack having such a structure is installed and used in various apparatuses, such as vehicles and the like, there is possibility that water, dust and the like will enter gaps between cells. Furthermore, such apparatuses normally produce vibrations during operation. If such vibrations or loads attributed to the vibrations act on the stack, there is possibility that gaps may be formed between cells due to strains occurring in the stack. Therefore, there is possibility that the stack may suffer a power generating efficiency reduction due to an increase in the internal resistance, and a power generation failure, etc.

To solve these problems, it is possible to employ a method in which the outer peripheral surface of a stack case is completely sealed and the rigidity of the stack case is increased to such a degree that the stack case is not deformed by vibrations or the like. However, the addition of the step of sealing the outer periphery of the stack case degrades the productivity of the stack. In order to sufficiently increase the rigidity of the stack case, it is necessary to increase the plate thickness of the stack case. Therefore, an increase in the rigidity of the stack results in a weight increase and a size increase of the stack. These problems have particularly great effect in a fuel cell apparatus having a plurality of stacks.

A fifth problem regarding a stack is a problem attributed to a mechanism for applying an elastic force to the stacked cell. When a stack is formed by stacking cells, it is desirable to place cells as close to one another as possible, in order to reduce the internal resistance. Furthermore, during power generation, heat is produced through chemical reactions, and thermally expands the cells. Therefore, if stacked cells are completely fixed, there is possibility of deformation due to heat strains, and therefore there is possibility of causing detrimental effects such as a power generation failure, a service life reduction, etc.

A technology for solving this problem is disclosed in Japanese Patent Application Laid-Open No. HEI 11-233132. In this technology, an end plate is attached, via a disc spring, to an end of stacked cells. Due to the elastic force of the disc spring, deformation caused by thermal expansion or the like is absorbed, and the cells are forced into close contact with one another. Another technology for solving aforementioned problem is disclosed in Japanese Patent Application Laid-Open No. HEI 7-335243. In this technology, an end plate is attached, via an elastic member, to an end of stacked cells, and a space between the end plate and the end of the stacked cell is used as a pressure chamber into which liquid can be charged. Using the elastic force of the elastic member and the pressure of the liquid, the technology absorbs deformation caused by thermal expansion or the like and applies a force to place the cells in close contact with one another.

In these technologies, however, the end plate is fixed by bolts that extend through cells in the stacking direction. Therefore, there is a problem of a bolt space increasing the size of the stack and, in particular, the dimension of the stack in the stacking direction. In a fuel cell, it is necessary to stack many cells in order to secure a certain voltage, so that the dimension of the stack in the stacking direction inevitably tends to increase. It is often preferable to avoid a configuration of a fuel cell having an extremely large size in any given direction, in view of installation space thereof in vehicles and other various apparatuses. Therefore, it is desirable to reduce the size of a cell in the stacking direction. A size increase attributed to the bolt space mentioned above reduces the efficiency in installing the stack in an apparatus. The effect of an increase in the size in the stacking direction is particularly great in a fuel cell apparatus having a plurality of stacks. Therefore, there has been a demand for a technology capable of providing an appropriate elastic force to stacked cells in a stacking direction and capable of reducing the size of the stack and, in particular, the size thereof in the stacking direction.

As stated above, the conventional fuel cells have various practical problems. Due to these problems, the significant problem of a large-size stack exists.

SUMMARY OF THE INVENTION

Accordingly, it is an object of the invention to solve at least one of the aforementioned five problems while avoiding a size increase of a stack.

In order to solve at least one of the aforementioned various problems while achieving a size reduction of a fuel cell apparatus, the invention adopts constructions as follows.

In accordance with a first aspect of the invention, a fuel cell apparatus includes at least one cell stack formed by stacking unit cells, and a cooling mechanism that cools the at least one cell stack by passing a cooling medium through the at least one cell stack. The cooling mechanism has a supply opening for supplying the cooling medium to the cell stack, and a discharge opening for discharging the cooling medium from the cell stack. The supply opening and the discharge opening are electrically short-circuited.

In the first aspect of the invention, the supply opening and the discharge opening are short-circuited, so that the electric potential difference in the cooling water between the supply opening and the discharge opening can be eliminated. Therefore, detrimental effects, such as galvanic corrosion and the like, can easily be avoided.

The means for electrically short-circuiting the cooling medium passage having an electric potential difference can be realized by connecting the supply opening and the discharge opening via an electrically conductive member, so that detrimental effects, such as a size increase of the fuel cell apparatus, a production cost increase, etc., will not be caused. Furthermore, it becomes unnecessary to provide an insulating member for the supply opening and the discharge opening, and therefore a size increase of the apparatus can be avoided. Furthermore, a restriction that the supply opening and the discharge opening must be provided at sites without an electric potential difference is also eliminated. Therefore, the degree of freedom in design increases, so that the apparatus can be further reduced in size.

The supply opening and the discharge opening are provided in the cell stack in order to supply and discharge the cooling medium. The supply opening is a portion where the cooling medium is supplied to the cell stack, and includes a cooling medium passage upstream of the supply opening. The discharge opening is a portion where the cooling medium is discharged from the cell stack, and includes a cooling medium passage downstream of the discharge opening. Therefore, the short circuit device in the invention can be provided outside the cell stack. Hence, it becomes possible to mount the short circuit device after the cell stack is formed. Thus, this construction advantageously makes it possible to provide the short circuit device without degrading the efficiency in production of the cell stack. Furthermore, if a problem, such as a broken wire or the like, occurs, the problem can be easily coped with.

The short circuit device may be provided for a single cell stack. However, if the fuel cell apparatus has a plurality of cell stacks, a cooling medium passage may be provided which conveys at least a portion of the cooling medium upstream of the supply opening of each cell stack and at least a portion of the cooling medium downstream of the discharge opening of each cell stack, and the short circuit device may be provided at a location where a common cooling medium passage shared by the cell stacks is provided.

In this construction, the short circuit device is provided for a common cooling medium passage, so that the electric potential difference in the cooling medium can be eliminated without a need to provide a short circuit device for each cell stack. Therefore, the process and cost for providing the short circuit device can be minimized. Since the cooling medium can have a considerably great electric potential difference after passing through cell stacks, the usefulness of the invention is very high in that the electric potential difference can easily be eliminated.

As an example of the fuel cell apparatus having a plurality of cell stacks, a construction having a supply/discharge member that realizes the supply and discharge of a fuel between the cell stacks and an external device by performing the function of distributing the fuel gas supplied to the supply/discharge member to the cell stacks and the function of gathering an exhaust gas from the cell stacks may be cited. In this case, the aforementioned common cooling medium passage is formed within the supply/discharge member, and the construction of the invention can be realized by short-circuiting the vicinities of the supply opening and the discharge opening for supplying and discharging the cooling water with respect to the supply/discharge member.

In accordance with a second aspect of the invention, a fuel cell apparatus includes a plurality of cell stacks formed by stacking unit cells, and a supply/discharge member that supplies and discharges a fuel between the cell stacks and an external member by performing a function of distributing a fuel gas supplied to the supply/discharge member to the cell stacks and a function of gathering an exhaust gas from the cell stacks. The supply/discharge member has, as internal constructions, a gathered gas channel through which the gathered exhaust gas flows, and a drainage member that is branched from the gathered gas channel and that discharges water droplets from the gas channel.

In the second aspect, the drainage mechanism provided in the supply/discharge member appropriately discharges water droplets from the gas passage, thereby avoiding flooding. Furthermore, since the drainage mechanism is provided in the supply/discharge member, the apparatus eliminates the need to provide a drain valve or the like outside the supply/discharge member, and therefore avoids a size increase of the apparatus, unlike the related-art technology described in Japanese Patent Application Laid-Open No. HEI 11-204126. In particular, since the drainage mechanism is provided in the supply/discharge member, provision of a drainage mechanism for each cell stack is avoided, so that the apparatus size can be reduced.

The drainage mechanism may include a water storage mechanism for temporarily storing water droplets, and a drain pipe for discharging water from the water storage mechanism. The drain pipe may be constructed so that water is discharged by gravity. The drain pipe may also be constructed so that water is discharged by using the pressure of gas flowing through the gas channel. In order to smoothly and consistently supply the fuel gas to the unit cells, the gas is supplied at a relatively high pressure. Although there is a pressure loss in the unit cells, the gas discharged therefrom has a pressure that is sufficiently higher than the atmospheric pressure that it is possible to discharge water through the use of the exhaust gas pressure, by using a water storage mechanism in which the exhaust gas pressure acts on water surfaces. For example, a water storage mechanism may be provided in a site of the gas channel where the pressure becomes locally high due to a curvature of the passage, a water storage mechanism may be provided together with a branch channel connected to the gas channel at an acute angle to the exhaust gas flowing direction, or the like. If the pressure is used for drainage, the degree of freedom regarding the position of the drain pipe increases, so that the apparatus size can be reduced in comparison with drainage based merely on the gravity.

In accordance with a third aspect of the invention, a fuel cell apparatus includes a plurality of cell stacks formed by stacking unit cells, and a securing member for securing the stacked unit cells. The securing member has an insulating layer that is provided on a surface of the securing member that contacts the unit cells.

In the third aspect, a step of inserting an insulating member between unit cells and a securing member can be omitted from the process of producing a cell stack. Thus, productivity improves. Since the process of stacking unit cells is a precision process that greatly affects the performance of the cell stack, simplification of this process leads to a considerable improvement in productivity. The method for providing the insulating layer integrally with the securing member may be, for example, one in which the insulating member is adhered to a surface of the securing member, one in which an insulating material is applied to a surface of the securing member, and the like. Since the insulating member and the securing member are integrally formed by a method as mentioned above, it becomes possible to reduce the thickness of the insulating layer, and it also becomes possible to curb the dimensional error in thickness, in comparison with a case where the insulating layer is separately prepared.

Furthermore, if the insulating layer is separately prepared, it is necessary to provide a sufficiently large clearance between the cell stack and the securing member so that should the insulating member shift in position, the securing member will not contact the cell stack. However, since the insulating layer is formed integrally with the securing member, such a consideration becomes unnecessary, and the clearance between the unit cells and the securing member can be reduced. Due to the effects mentioned above, the fuel cell apparatus in accordance with the third aspect, in which the securing member and the insulating layer are integrated, allows a size reduction of the apparatus.

In accordance with a fourth aspect of the invention, a fuel cell apparatus includes a plurality of cell stacks formed by stacking unit cells, and a container that houses the plurality of cell stacks altogether, and that has a sealed construction that is able to prevent penetration of foreign substances from outside. Examples of the foreign substance include dust, water, and the like.

The provision of the container eliminates the need to provide each cell stack with a device for completely blocking foreign substances. Therefore, the construction of the cell stack can be simplified, and the cell stack can be reduced in size. Furthermore, productivity can be improved, and the production cost can be reduced. Furthermore, if there is a need to monitor the electric potential of the unit cells, the provision of the container makes it possible to construct the cell stack in a condition where the unit cell scan be seen. Thus, the container is highly useful.

The fuel cell apparatus in the fourth aspect of the invention also has advantages in view of securing rigidity. If a fuel cell apparatus is installed in a vehicle or the like, the fuel cell apparatus is subject to vibrations and various external forces. In order to perform stable power generation, it is necessary to secure such rigidity for the fuel cell apparatus that the fuel cell apparatus does not undergo deformation due to vibrations or external forces. The "deformation" herein is mainly a bending deformation and a torsional deformation. The rigidity regarding these deformations can be evaluated using second moment of area and polar moment of area as indices. These factors are known to become greater in a section that has a greater distance from the neutral axis of the bending deformation and the rotating axis of the torsional deformation. Since the container in the fourth aspect houses the cell stacks as a unit, the container apparently has a greater second moment of area and greater polar moment of area than the cell stacks. Therefore, the fuel cell apparatus in the fourth aspect is able to secure a sufficient rigidity while curbing increases in the plate thicknesses of the members. If the container has a good rigidity, the cell stacks do not need to have such a great rigidity, so that a size reduction can be achieved. Furthermore, since an increase in the plate thicknesses of the container can be curbed, an increase in the total weight of the fuel cell apparatus can be curbed.

In the fuel cell apparatus in the fourth aspect may further include a discharge mechanism that discharges at least one of a liquid and a gas present in the container, to outside the container, separately from a supply/discharge mechanism that supplies and discharges a fuel gas, an oxidative gas, and cooling water with respect to the cell stacks within the container.

Since hydrogen, which is used as a fuel gas, is a substance of a very small molecule size, there are cases where hydrogen leaks from various joints of unit cells in an exuding manner during operation. Water produced through the reactions in the fuel cell apparatus may also leak out of the cell stacks. In the fuel cell apparatus in this aspect, there is a possibility that a liquid or a gas discharged as described above will accumulate in the container, since the container is sealed. However, the discharge mechanism as described above is able to appropriately discharge the gas or liquid from the container. As the discharge mechanism, a simple construction wherein a discharge pipe is connected may be used. However, in order to prevent entrance of external substances, it is preferable to provide a valve body or the like in the connecting portion.

In accordance with a fifth aspect of the invention, a fuel cell apparatus includes at least one cell stack formed by stacking unit cells, an elastic member that applies an elastic force to the unit cells in a stacking direction, a pair of end plates which are disposed at opposite ends of the unit cells stack, in such a manner that the end plates are substantially parallel to the unit cells, and which have such a rigidity that the end plates are allowed to be regarded as rigid plates with respect to the elastic force, and an interconnecting member which interconnects the end plates, and which causes on the end plates a force that counterbalances the elastic force. The end plates and the interconnecting member are fastened by a fastening member inserted in a direction substantially perpendicular to the stacking direction.

In the fifth aspect, the elastic force from the elastic member makes it possible to absorb thermal deformation and hold the unit cells in sufficiently close contact with one another, thereby realizing stable operation. In the fifth aspect, the mechanism for applying an elastic force as described above adopts a construction in which the interconnecting member bears the load applied to the end plates as a reaction to the elastic force applied to the unit cells. The fastening member for fastening the interconnecting member and the end plates is inserted in a direction perpendicular to the stacking direction. If the fastening member is inserted in the stacking direction, the size of the cell stack in the stacking direction correspondingly increases. In contrast, if the fastening member is inserted in a direction perpendicular to the stacking direction, such a size increase can be avoided.

The above-described construction is particularly useful in a fuel cell apparatus having a plurality of cell stacks, as stated below. In the fuel cell apparatus having a plurality of cell stacks, it is preferable to provide a supply opening and a discharge opening in the stacking direction, in order to uniformly supply a fuel gas and the like to the unit cells. In particular, if the cell stacks are connected by using a supply/discharge member as described above, each cell stack is connected to the supply/discharge member via one of the end plates of the stack. In the fifth aspect, since the fastening member is inserted in a direction perpendicular to the stacking direction, interference of the fastening member at a junction surface of the supply/discharge member can be avoided. Furthermore, it is possible to check the fastened state achieved by the fastening member even after the supply/discharge member and the cell stacks are connected. Therefore, ease of maintenance improves.

Furthermore, if the fuel cell apparatus of the fifth aspect of the invention has a plurality of cell stacks, it is desirable that the cell stacks be arranged in a direction perpendicular to the direction of insertion of the fastening member. This arrangement avoids interference between the fastening members of adjacent cell stacks, and makes it possible to pursue a further size reduction of the fuel cell apparatus. Furthermore, ease of maintenance also improves. Although the construction according to the fifth aspect is particularly useful where a plurality of cell stacks are incorporated, the construction of the fifth aspect may also be effectively applied to a single cell stack.

Although the fuel cell apparatuses in accordance with the first to fifth aspects of the invention have been separately described above, it is also possible to construct various fuel cell apparatuses in accordance with combinations of those aspects of the invention. In such a case, a fuel cell apparatus with a combination of the advantages of the fuel cell apparatuses of the first to fifth aspects can be realized. Although the above-described fuel cell apparatuses of the invention are preferably applied to a polymer electrolyte fuel cell whose size reduction is expected, the application is not limited so. That is, the invention is also applicable to various other types of fuel cells, such as phosphoric acid fuel cells, molten carbonate fuel cells, electrolyte fuel cells, alkaline fuel cells, etc.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
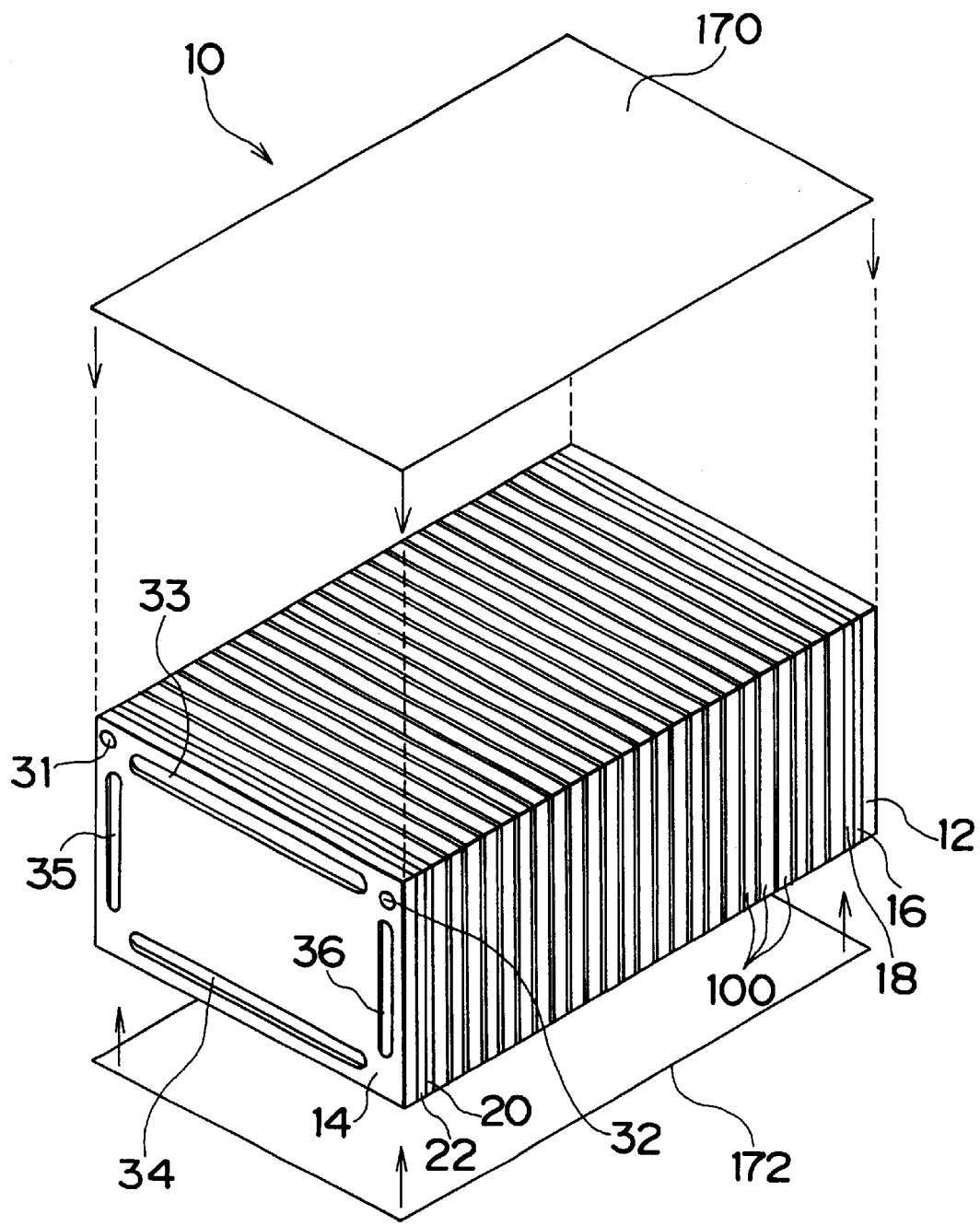
FIG. 1 is a perspective view of a stack 10 according to an embodiment, schematically illustrating the construction thereof.

Preferred embodiments of the invention will be described hereinafter with reference to the accompanying drawings. Description will be made in the following sequence:
A. Overall Construction
B. Short Circuit Construction in Cooling System
C. Drain Mechanism
D. Tension Plate Insulating Construction
E. Cell Securing Construction And Stack Arrangement
F. Outer Case A. Overall Construction FIG. 1 is a schematic perspective view illustrating a construction of a stack 10 according to an embodiment of the invention. The stack 10 is formed as a cell stack by stacking a predetermined number of cells 100 that are unit cells for producing an electromotive force. The stacked cells 100 are secured by fastening them to tension plates 170, 172 that are disposed on upper and lower sides of the stacked cells 100. Each cell 100 is formed as a polymer electrolyte fuel cell, and produces an electromotive force greater than 1 V. In each stack 10 of this embodiment, one hundred cells 100 are stacked so that the stack produces about 100 V. A detailed construction of each cell 100 will be descried below. Briefly, each cell 100 has a construction in which a cathode, an electrolyte membrane, and an anode are placed in that order, and are sandwiched by separators. In the stack 10, two adjacent cells 100 share a separator. In general, the term "stack" in this field has two meanings. That is, the term can simply refer to a set of stacked cells, and can also refer to a construction that includes stacked cells and members for securing the cells. In this specification, the term "stack 10" is used with the latter meaning, that is, it refers to a construction that includes the cells 100 and the upper and lower tension plates 170, 172. For the former meaning, a term "narrow-definition stack" is used.

The stack 10 is formed by stacking an end plate 12, an insulator plate 16, a current collector plate 18, the cells 100, a current collector plate 20, an insulator plate 22, and an end plate 14, in that order, starting at one end of the stack 10. The end plates 12, 14 are formed from a metal, such as copper or the like, in order to secure rigidity. The current collector plates 18, 20 are formed by gas-impermeable electrically conductive members, such as closely packed carbon members, copper plates, or the like. The insulator plates 16, 22 are formed by insulative members, such as rubber or resin members, or the like. The electric power generated by the stack 10 is outputted via connections to the current collector plates 18, 20.

The end plate 14 on one side has a fuel gas supply opening 35, a fuel gas discharge opening 36, an oxidative gas supply opening 33, an oxidative gas discharge opening 34, a cooling water supply opening 31, and a cooling water discharge opening 32. The fuel gas, after being supplied into the stack 10 from the fuel gas supply opening 35, is distributed to each cell 100 while flowing toward the end plate 12. The fuel gas distributed into a cell 100 flows through channels from a left side to a right side of the cell 10 in FIG. 1, and flows toward the end plate 14, and then is discharged from the fuel gas discharge opening 36. Similarly, the oxidative gas, after being supplied into the stack 10 from the oxidative gas supply opening 33, is distributed to each cell 100 while flowing toward the end plate 12. The oxidative gas distributed into a cell 100 flows through channels from an upper side to a lower side of the cell 100 in FIG. 1, and then is discharged from the oxidative gas discharge opening 34.

Cooling water, after being supplied from the cooling water supply opening 31, flows through cooler separators that are provided at predetermined intervals. After cooling the cells 100 in that fashion, the cooling water is discharged from the cooling water discharge opening 32. Thus, gas channels are formed in the cells 100 of the stack 10 so as to realize the above-described flows of the gasses and the cooling water. An electrolyte membrane 132 (described below) of each cell 100 is sealed at its peripheral regions that contact separators 110, 120. This sealing prevents the fuel gas and the oxidative gas from leaking from inside the cell 100 and mixing together.

Figure 2:
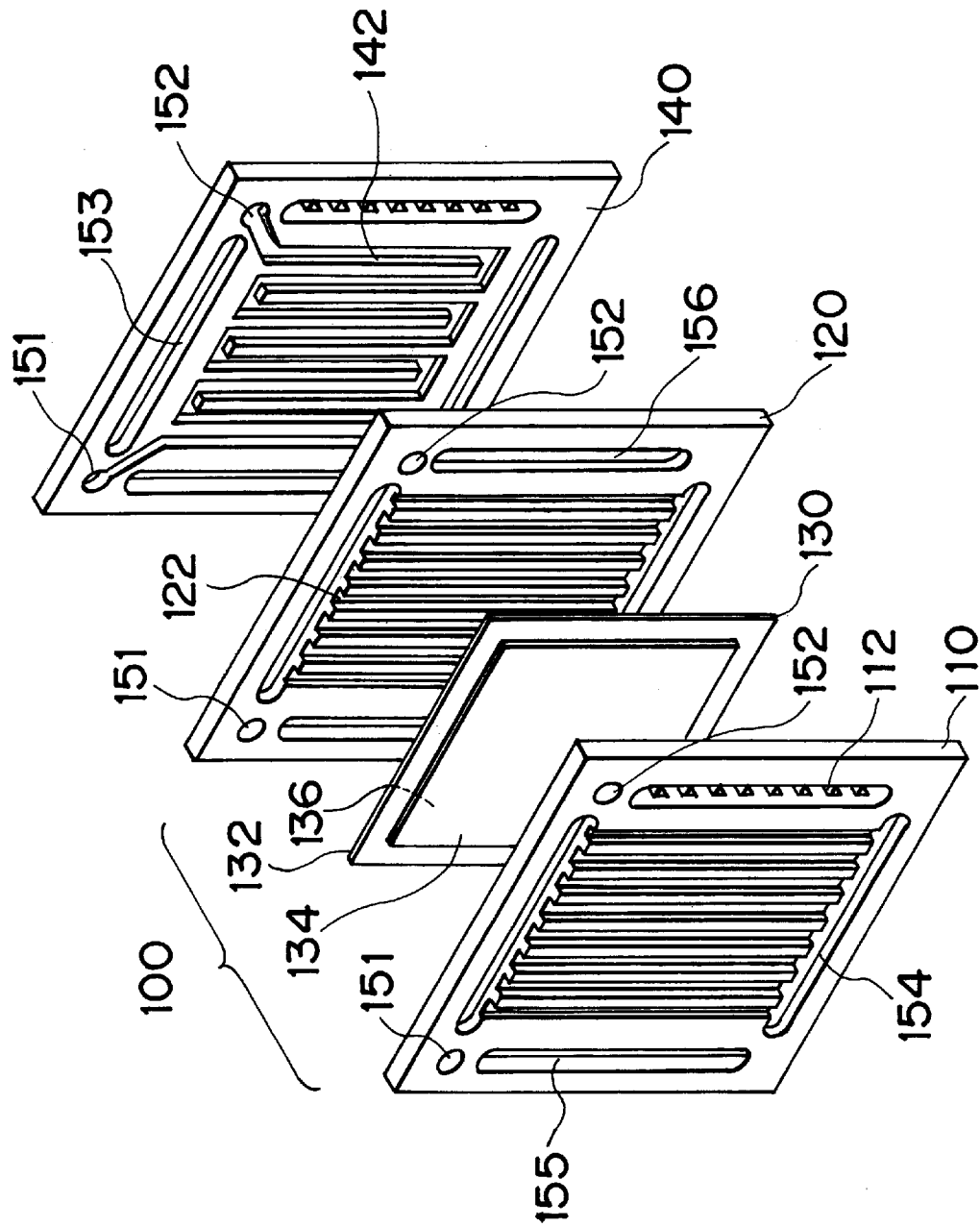
FIG. 2 is a perspective view illustrating a construction of a cell 100.

FIG. 2 is a perspective view illustrating the construction of a cell 100. The cell 100 is constructed as a polymer electrolyte fuel cell. The cell 100 has a construction in which the electrolyte membrane 132 is sandwiched by an anode 134 and a cathode 136, and this assembly is further sandwiched by separators 110, 120. The cathode 136 is present on a side of the electrolyte membrane 132 opposite from the anode 134, that is, on a side of the electrolyte membrane 132 that is hidden in FIG. 2. The anode 134 and the cathode 136 are gas diffusion electrodes. The separators 110, 120 have ribs on their sides facing the anode 134 and the cathode 136. Since the separators 110, 120 sandwich the anode 134 and the cathode 136, fuel gas channels 112 are formed between the separator 110 and the anode 134, and oxidative gas channels 122 are formed between the separator 120 and the cathode 136. Each separator 110, 120 has ribs on both sides. The ribs on one side of the separator 110, together with the anode 134, define the fuel gas channels 112. The ribs on the other side of the separator 110, together with the cathode 136 of an adjacent cell 100, define the oxidative gas channels 122. Thus, the separators 110, 120 form the gas channels, together with the gas diffusion electrodes, and separate the fuel gas and the oxidative gas flowing in adjacent cells.

The electrolyte membrane 132 is a proton-conductive ion exchange membrane formed from a polymer material, for example, a fluorine-based resin. The electrolyte membrane 132 exhibits good electric conductivity in a wet condition. For example, a Nafion membrane (by Du Pont) may be used as the electrolyte membrane 132. A surface of the electrolyte membrane 132 is coated with platinum as a catalyst. In this embodiment, the catalyst is applied to the electrolyte membrane 132 by the following method. That is, carbon powder loaded with platinum as a catalyst is dispersed in a suitable organic solvent. A suitable amount of an electrolyte solution (for example, Nafion Solution by Aldrich Chemical) is added to the solvent with dispersed carbon, to form a paste. The paste is applied to the electrolyte membrane 132 by screen printing. Various other methods may also be employed to form the catalyst layer. For example, it is possible to form a sheet of a paste containing carbon powder loaded with the aforementioned catalyst through film formation, and press the sheet onto the electrolyte membrane 132.

As for the catalyst, it is also possible to use an alloy of platinum and another metal. The anode 134 and the cathode 136 are formed by carbon cloths produced by weaving yarns of carbon filaments. The anode 134 and the cathode 136 may also be formed by a carbon felt or a carbon paper formed of carbon fibers or filaments. Although the catalyst needs to exist between the gas diffusion electrodes and the electrolyte membrane 132, there is no restriction regarding which member to apply the catalyst to. That is, the method in which the catalyst is applied to the electrolyte membrane 132 may be substituted with a method in which the catalyst is applied to sides of the anode 134 and the cathode 136 that face the electrolyte membrane 132.

The separators 110, 120 are each formed by a gas-impermeable electrically conductive member, for example, a packed carbon member that has been made gas-impermeable by compressing a carbon material. Each separator 110, 120 has on each side a plurality of ribs that extend in parallel. The ribs on the two sides of each separator do not need to be parallel, but may extend at different angles; for example, the ribs on one side may extend in a direction perpendicular to the direction of the ribs on the other side. Furthermore, as long as the ribs are able to define the fuel gas channels and the oxidative gas channels, the configuration of the ribs is not particularly restricted, that is, the ribs do not necessarily define parallel grooves.

Each separator 110, 120 has, at two locations in a peripheral portion thereof, cooling water holes 151, 152, each of which has a circular section. When cells 100 are stacked, the cooling water holes 151, 152 form cooling water channels that extend through the stack 10 in the stacking direction. The separator 110, 120 also has, near the sides thereof, fuel gas holes 153, 154 and oxidative gas holes 155, 156 that are elongated along their adjacent sides. When the stack 10 is formed by stacking the cells 100, the fuel gas holes 153, 154 and the oxidative gas holes 155, 156 form fuel gas channels and oxidative gas channels that extend through the stack 10 in the stacking direction. In this embodiment, a fuel gas supply passage is formed along the left side of the stack 10 in FIG. 2, and a fuel gas discharge passage is formed along the right side. Furthermore, an oxidative gas supply passage is formed along the upper side, and an oxidative gas discharge passage is formed along the lower side.

The fuel gas supply opening 35 of the stack 10 is connected to the fuel gas supply passage, and the fuel gas discharge opening 36 is connected to the fuel gas discharge passage. The fuel gas supplied via the fuel gas supply opening 35 flows into the fuel gas channels 112 of each cell 100 via the fuel gas supply passage. After undergoing the predetermined reaction on the anode 134 of each cell 100, the fuel gas flows out to the fuel gas discharge opening 36 via the fuel gas discharge passage. The oxidative gas flows by a similar route. The oxidative gas supply opening 33 of the stack 10 is connected to the oxidative gas supply passage, and the oxidative gas discharge opening 34 is connected to the oxidative gas discharge passage. The oxidative gas supplied via the oxidative gas supply opening 33 flows into the oxidative gas channels 122 of each cell 100 via the oxidative gas supply passage. After undergoing the predetermined reaction on the cathode 136 of each cell 100, the oxidative gas flows out to the oxidative gas discharge opening 34 via the oxidative gas discharge passage.

In the stack 10, cooler separators 140 are provided at a rate of one piece for every five cells 100. The cooler separators 140 are provided for forming cooling water passages for cooling the cells 100. Each cooler separator 140 has cooling water grooves 142 that connect between the cooling water holes 151, 152 and that extend in a serpentine-folded form. Surfaces of separators 110, 120 that face a cooler separator 140 are flat surfaces without ribs. The grooves formed on each cooler separator 140, together with the adjacent separators 110, 120, form cooling water passages. The separators 110, 120 and the cooler separator 140 may be formed from a packed carbon material or various other electrically conductive materials. For example, a metal, such as a copper alloy, an aluminum alloy or the like, may be used to form the separators, for the sake of good rigidity and good heat conductivity. The rate of cooler separators 140 can be set within a range suitable for cooling, in accordance with various conditions, for example, the flow rate and temperature of the cooling water, the amount of heat produced by the cells 100 in accordance with the required output of the stack 10, etc.

Figure 3:
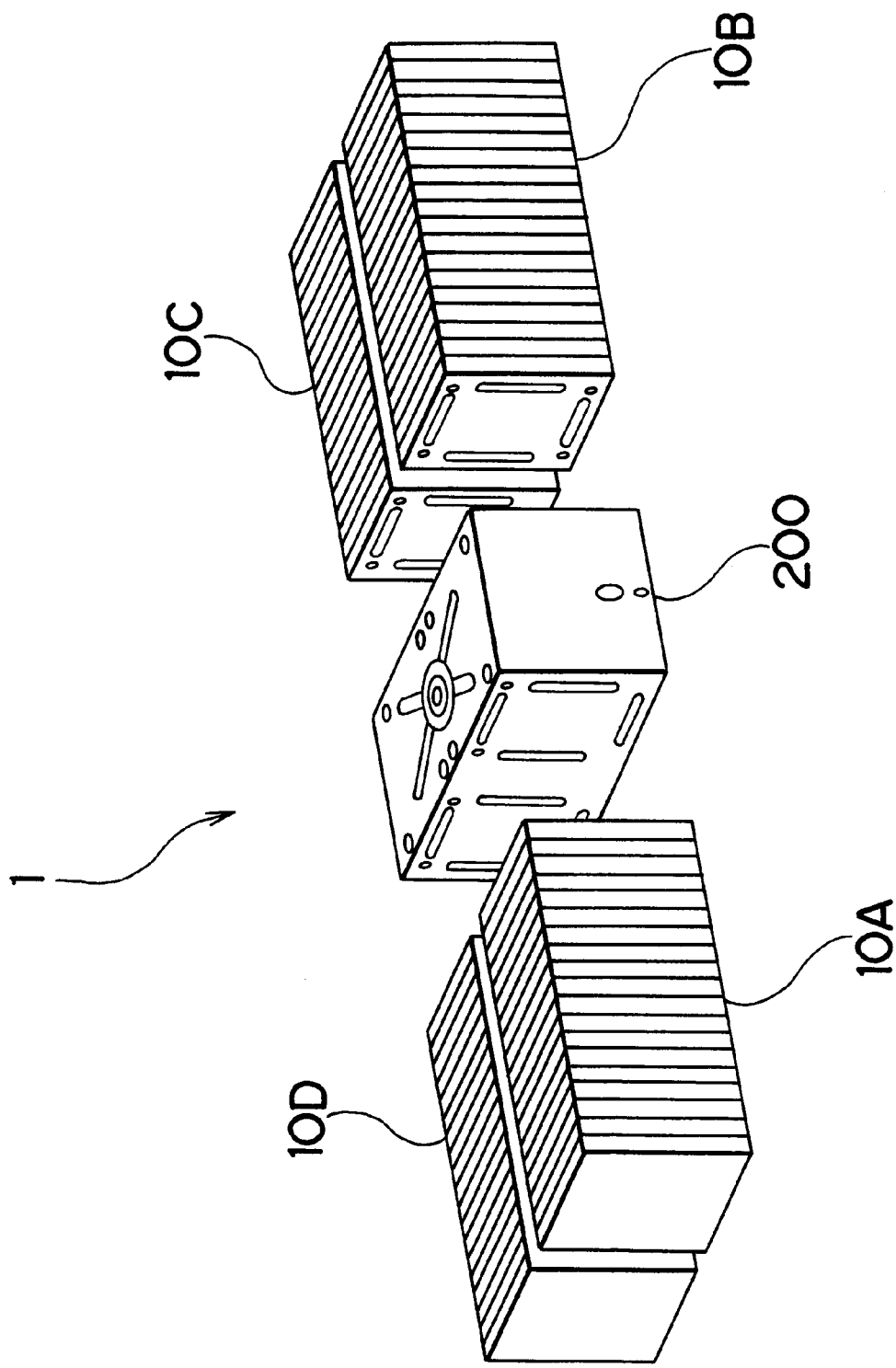
FIG. 3 is an exploded perspective view schematically illustrating a construction of a fuel cell apparatus 1.

A fuel cell apparatus 1 of this embodiment is formed by connecting four stacks 10 described above. FIG. 3 is an exploded perspective view schematically illustrating the construction of the fuel cell apparatus 1. In this embodiment, the four stacks 10A–10D are connected to two opposite surfaces of a rectangular parallelepiped-shaped supply/discharge box 200. The supply/discharge box 200 is connected to a fuel supply, an oxidative gas supply, and a cooling water supply. The fuel, the oxidative gas, and the cooling water are equally distributed to the stacks 10A–10D via the supply/discharge box 200, and are gathered from the stacks 10A–10D to the supply/discharge box 200, and then are discharged.

Figure 4:
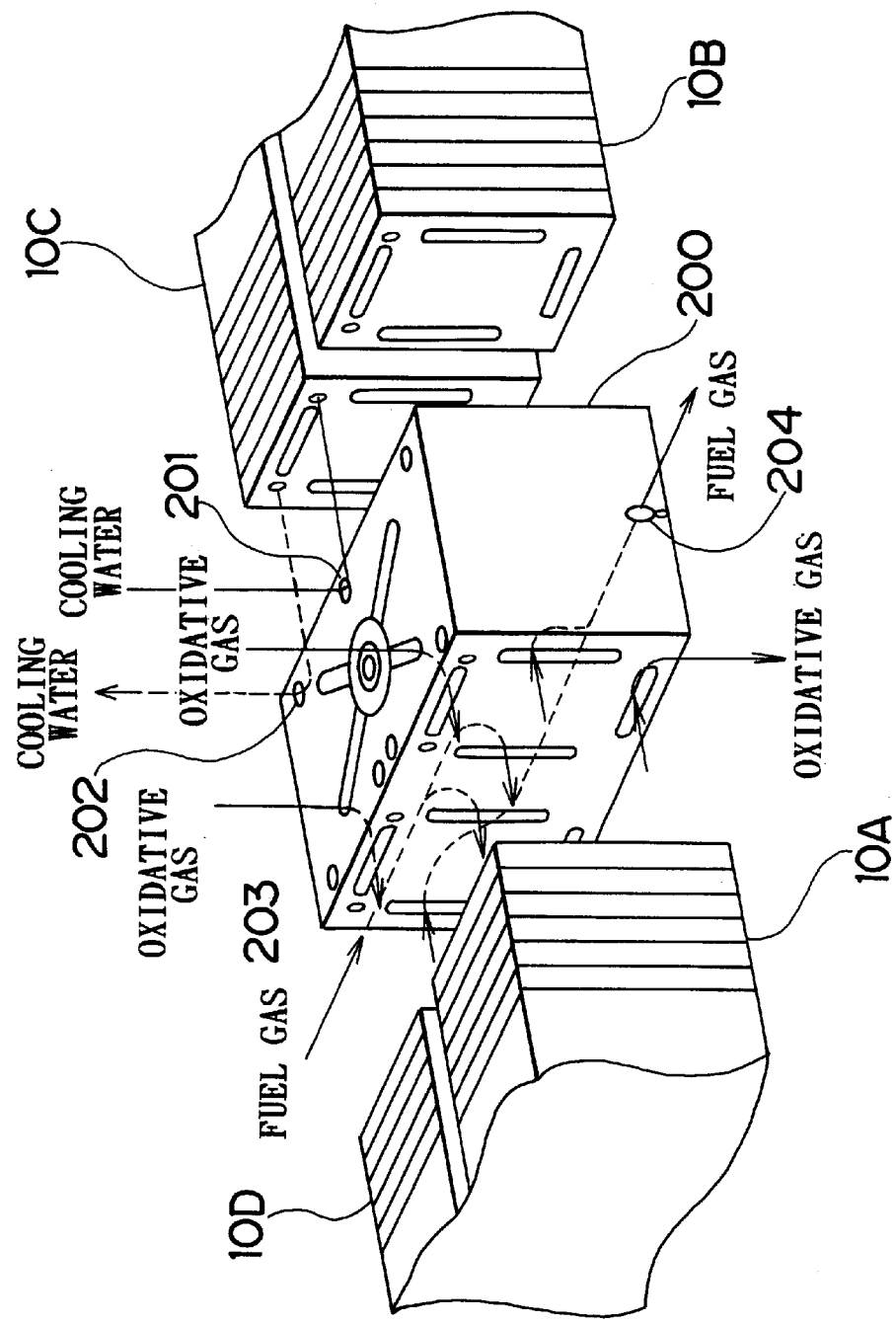
FIG. 4 illustrates how the fuel gas, the oxidative gas and the cooling water are supplied and discharged.

FIG. 4 illustrates how the fuel gas, the oxidative gas and the cooling water are supplied and discharged. The supply/discharge box 200 has holes that are connected to the fuel gas supply openings 35, the fuel gas discharge openings 36, the oxidative gas supply openings 33, the oxidative gas discharge openings 34, the cooling water supply openings 31, and the cooling water discharge openings 32 of the stacks 10A–10D. The other four surfaces of the supply/discharge box 200 not connected to the stacks 10A–10D have holes for connecting to the fuel supply, the oxidative gas supply, the cooling water supply, etc. Detailed description of the internal construction of the supply/discharge box 200 is omitted. Via the aforementioned holes, the supply/discharge box 200 supplies the fuel gas, the oxidative gas, and the cooling water to the stacks 10A–10D, and discharges them from the stacks.

As shown in FIG. 4, the cooling water is supplied and discharged via a water supply opening 201 and a water discharge opening 202 that are formed in the upper surface of the supply/discharge box 200. The supply/discharge box 200 has internal channels for distributing the cooling water supplied from the water supply opening 201 to the cooling water supply opening 31 of each stack, and channels for collecting the cooling water discharged from the cooling water discharge opening 32 of each stack to the water discharge opening 202. The cooling water supplied from outside is supplied to the stacks via a route indicated by a solid-line arrow in FIG. 4, and is discharged from the stacks via a routes indicated by a broken-line. Although in FIG. 4, only the routes of the cooling water with respect to the stack 10C are indicated to avoid complication of the illustration, substantially the same cooling water routes are provided for the stacks 10A, 10B, 10D.

The oxidative gas is supplied and discharged via a supply opening 203 formed in the upper surface of the supply/discharge box 200, and a discharge opening formed in the lower surface of the supply/discharge box 200, as shown in FIG. 4. The supply/discharge box 200 has internal channels for distributing the oxidative gas supplied to the supply opening 203 to the oxidative gas supply opening 33 of each stack 10A–10D, and channels for collecting the oxidative gas discharged from the oxidative gas discharge opening 34 of each stack 10A–10D to the discharge opening. The oxidative gas supplied from outside is supplied to the stacks and is discharged from the stacks via routes indicated by arrows in FIG. 4. Although in FIG. 4, only the routes of the oxidative gas with respect to the stacks 10A, 10D are indicated to avoid complication of the illustration, substantially the same oxidative gas routes are provided for the stacks 110B, 10C.

The fuel gas is supplied and discharged via a supply opening formed in the back surface of the supply/discharge box 200, and a discharge opening 204 formed in the forward surface of the supply/discharge box 200, as shown in FIG. 4. The supply/discharge box 200 has internal channels for distributing the fuel gas supplied to the supply opening to the fuel gas supply opening 35 of each stack 10A–10D, and channels for collecting the fuel gas discharged from the fuel gas discharge opening 36 of each stack 10A–10D to the discharge opening 204. The fuel gas supplied from outside is supplied to the stacks and is discharged from the stacks via routes indicated by arrows in FIG. 4. Although in FIG. 4, only the routes of the fuel gas with respect to the stacks 10A, 10D are indicated to avoid complication of the illustration, substantially the same fuel gas routes are provided for the stacks 110B, 10C.

The stacks 10A–10D are connected in series. Since each stack generates an electromotive force of about 100 V, the fuel cell apparatus 1 of this embodiment, having four stacks, achieves an electromotive force of about 400 V. Although this embodiment adopts a construction in which the stacks are connected via the supply/discharge box 200, various other constructions may be adopted to connect the stacks. The number of stacks employed may be set to any suitable number in accordance with the required voltage. In the fuel cell apparatus 1 of this embodiment, the supply/discharge box 200 and the four stacks 10A–10D are housed in a single outer case. The construction of the outer case will be described below. In the foregoing description, a typical construction of a fuel cell apparatus has been described. In the description below, characteristic constructions of the fuel cell apparatus of this embodiment will be separately described.

B. Short circuit Construction of Cooling System

Figure 5:
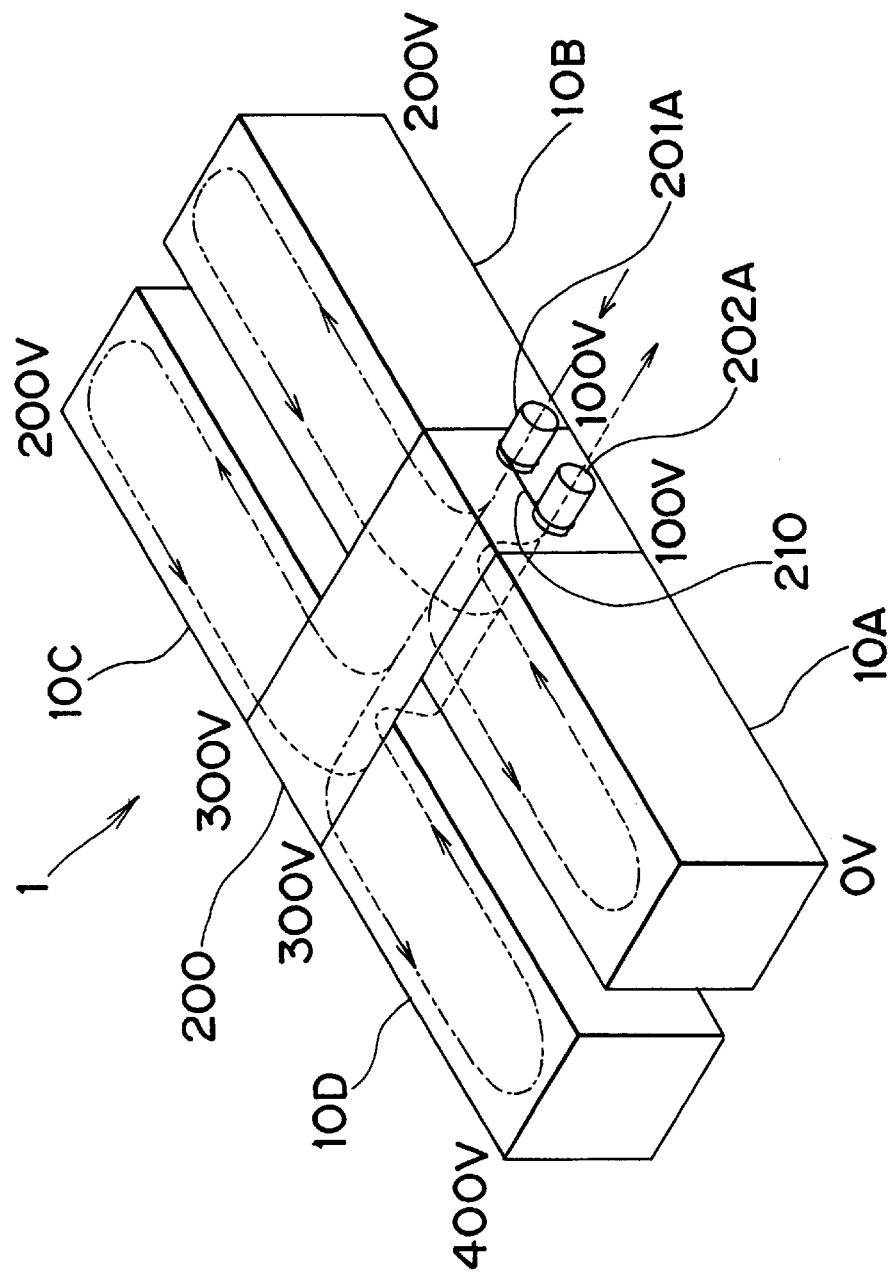
FIG. 5 is a conceptual illustration of a short circuit construction provided in a cooling system.

FIG. 5 is a conceptual illustration of a short circuit construction provided in a cooling system. As described above with reference to FIG. 4, the fuel cell apparatus of this embodiment has a construction in which the four stacks 10A–10D are connected via the supply/discharge box 200. The supply/discharge box 200 has the supply and discharge openings for distributing the cooling water to the four stacks and collecting the cooling water therefrom. Although in the construction shown in FIG. 4, the water supply and discharge openings are formed in the upper surface of the supply/discharge box 200, FIG. 5 shows a construction in which a water supply opening 201A and a water discharge opening 202A are formed in a side surface in order to avoid complication of the diagram illustrating features of the short circuit construction.

This embodiment employs a short-circuit cable 210 between the water supply opening 201A and the water discharge opening 202A provided as described above. In this embodiment, the short-circuit cable 210 formed by an electrically conductive wire is secured by winding it around the water supply opening 201A and around the water discharge opening 202A so as to reliably short-circuit the two openings. The short-circuit cable 210 may be secured in various fashions that make it possible to short-circuit the water supply opening 201A and the water discharge opening 202A. For example, the short-circuit cable 210 may be soldered to a point on each of the water supply opening 201A and the water discharge opening 202A, or may be bolted. The short-circuit cable 210 is not necessarily formed by an electrically conductive wire, but may also be formed by an electrically conductive plate that has holes through which the water supply opening 201A and the water discharge opening 202A extend. The short circuit construction may be provided not only in the fashion in which the water supply opening 201A and the water discharge opening 202A are connected by an electrically conductive member, but also in other fashions, for example, a fashion in which the two openings are disposed in contact so that they form a short circuit. Furthermore, a short circuit construction may be formed on a surface of the supply/discharge box 200 by etching or the like, as in a technique employed in a printed circuit board.

The operation of the short-circuit cable 210 is described below. As described above with reference to FIG. 2, the cooling water supplied to the stacks passes through the cooler separators to cool the cells. Since each cooler separator is formed by an electrically conductive member, the cooling water is electrified in accordance with the electric potential of the cells at the time of cooling. Therefore, a potential difference between the cooling water in the water supply opening 201A and the cooling water in the water discharge opening 202A occurs in some cases. FIG. 5 shows flows of the cooling water in this embodiment. As shown in FIG. 5, the cooling water supplied from the water supply opening 201A is distributed to the stacks 10A–10D, and then is gathered and discharged from the water discharge opening 202A after cooling the stacks.

Since the four stacks are connected in series in this embodiment, the electric potential rises in increments of 100 V from the stack 10A to the stack 10D. Therefore, as shown in FIG. 5, the cooling water that has cooled the stack 10A, 10B is electrified to about 100 V, and the cooling water that has cooled the stack 10C, 10D is electrified to about 300 V. As a result, an electric potential difference of about 200 V occurs between the water supply opening 201A and the water discharge opening 202A.

Thus, this embodiment is able to eliminate the electric potential difference between the water supply opening 201A and the water discharge opening 202A since the two openings are electrically short-circuited by the short-circuit cable 210. Therefore, this embodiment is able to avoid detrimental effects caused by the potential difference between the water supply opening 201A and the water discharge opening 202A, such as galvanic corrosion and the like. Furthermore, since the short circuit means can be relatively easily realized as described above, the short circuit construction does not cause detrimental effects, such as a size increase of the fuel cell apparatus, a production cost increase, or the like. Still further, the provision of the short circuit construction eliminates the need to provide the supply and discharge openings with insulating members, and therefore avoids a size increase of the apparatus caused by such insulating members. Further, the provision of the short circuit construction eliminates a restriction that the supply and discharge openings be provided at locations between which there is no electric potential difference, and the like. Therefore, the degree of freedom in design increases, so that a further size reduction of the apparatus can be pursued.

In this embodiment, the water supply opening 201A and the water discharge opening 202A of the supply/discharge box 200 are interconnected by the short-circuit cable 210. Although a short-circuit cable may be provided on each stack, the use of the supply/discharge box 200 achieves advantages of reducing work load. That is, if the supply/discharge box 200 is utilized, it is necessary to provide only one short-circuit cable, so that it becomes easy to dispose the short circuit construction. Furthermore should a problem, such as a break of the wire or the like, occur, the problem can easily be coped with.

Figure 6:
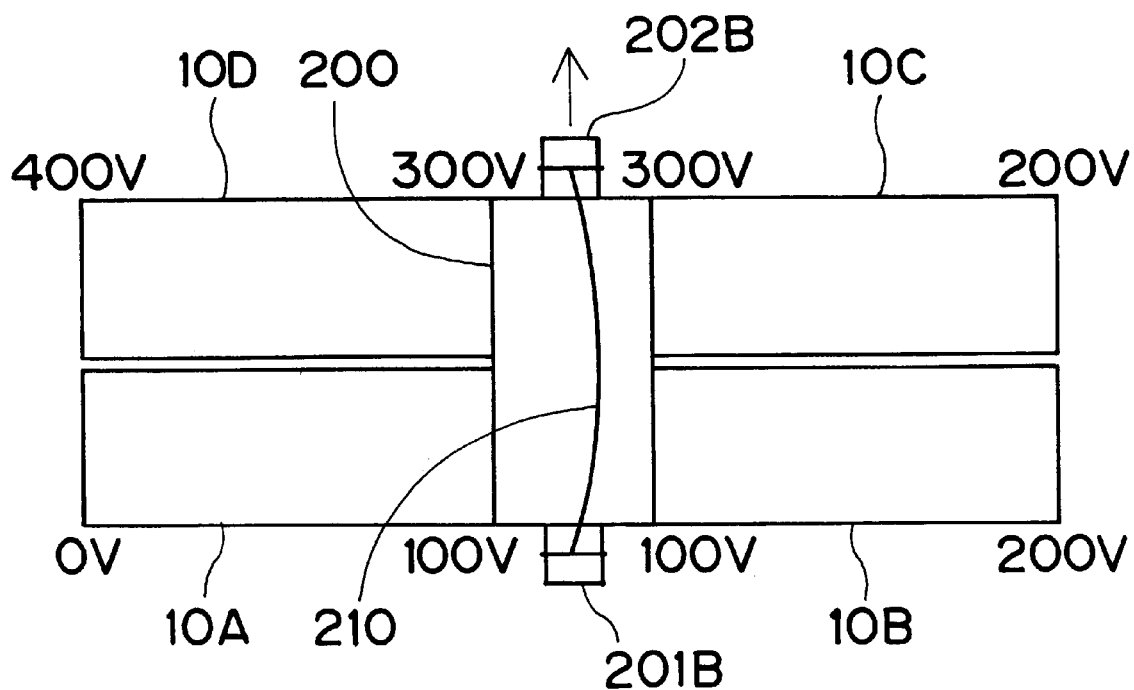
FIG. 6 illustrates a method of disposing a short circuit cable 210 according to a first modification.

Modifications of the method of laying the short-circuit cable 210 will be described. FIG. 6 illustrates a method of disposing a short-circuit cable 210 according to a first modification. FIG. 6 shows a plan view of stacks 10A–10D and a supply/discharge box 200. As can be seen from FIGS. 5 and 6, the first modification differs from the embodiment in that a water supply opening 201B and a water discharge opening 202B are provided on opposite surfaces of the supply/discharge box 200. In this modification, a short-circuit cable 210 can be laid across the supply/discharge box 200 so as to short-circuit the water supply opening 201B and the water discharge opening 202B. Although in this modification, it is easy to lay the short-circuit cable 210 outside the supply/discharge box 200, the short-circuit cable 210 may also be laid across the internal volume of the supply/discharge box 200.

Figure 7:
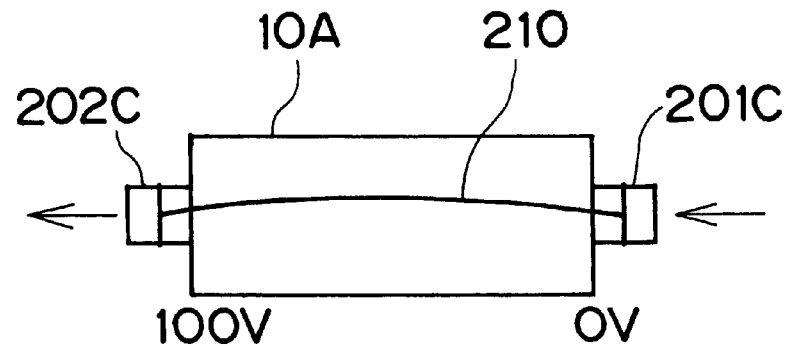
FIG. 7 illustrates a method of disposing a short circuit cable 210 according to a second modification.

FIG. 7 illustrates a method of laying a short-circuit cable 210 according to a second modification. Although in the embodiment, the short-circuit cable 210 is secured to the supply/discharge box 200, a short-circuit cable 210 is secured to each stack in this modification. As is apparent from FIG. 5, an electric potential difference in the cooling water does not occur in each stack since the cooling water is supplied and discharged at portions of equal potentials in each stack in the construction of the embodiment. However, in a construction as shown in FIG. 7 where a water supply opening 201C and a water discharge opening 202C are provided on opposite ends of each stack, an electric potential difference in the cooling water occurs in each stack. The second modification is applicable to the construction shown in FIG. 7. According to the second modification, a short-circuit cable 210 is laid across each stack to interconnect the water supply opening 201C and the water discharge opening 202C.

Figure 8:
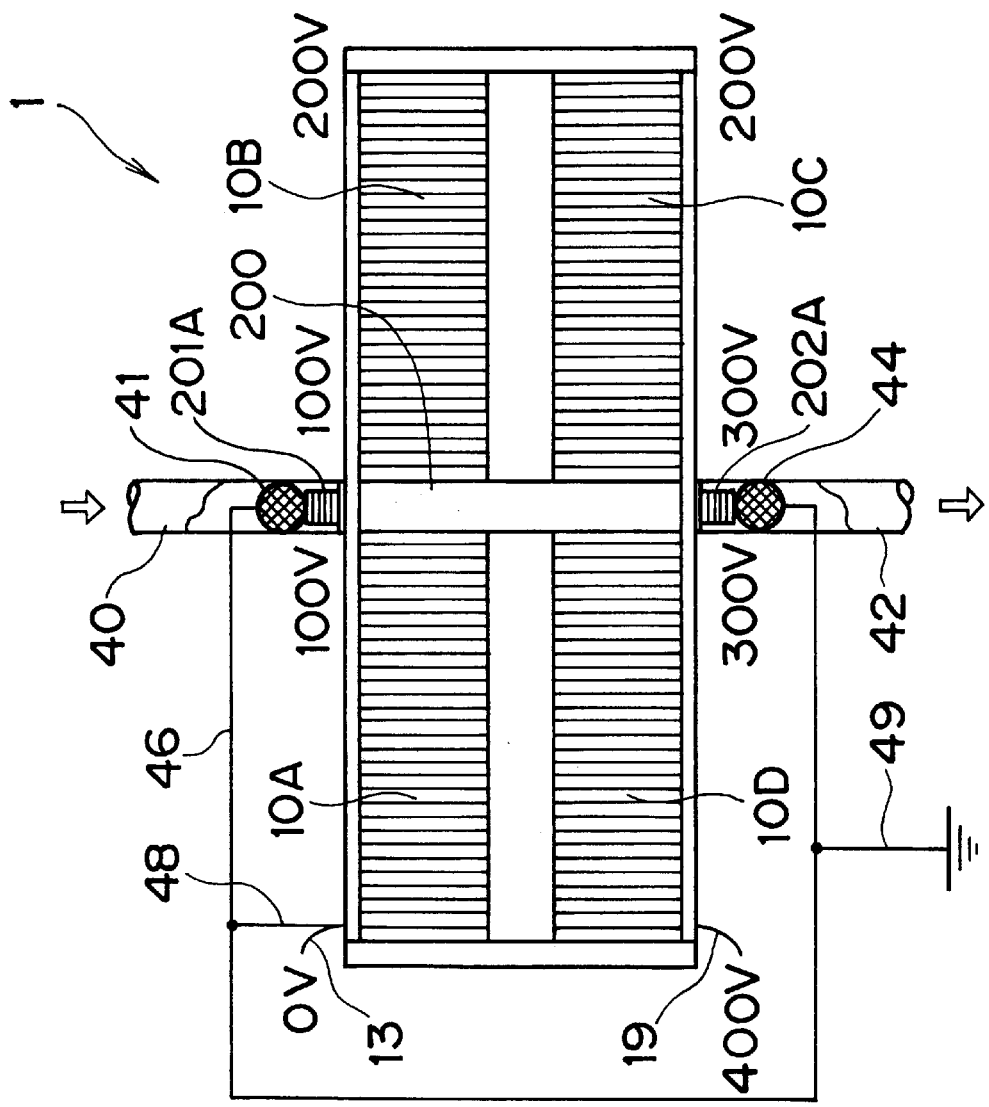
FIG. 8 illustrates another short circuit construction.

FIG. 8 illustrates a short circuit construction according to a third modification.

The third modification includes four fuel cell stacks 10A, 10B, 10C, 10D connected in series, and a supply/discharge box 200 for supplying fuel to the fuel cell stacks 10A, 10B, 10C, 10D and supplying a cooling medium (e.g., water or the like) into cooling medium channels formed in the fuel cell stacks 10A, 10B, 10C, 10D, as in the fuel cell construction shown in FIG. 5. In each of the fuel cell stacks 10A, 10B, 10C, 10D, a plurality of cells, that is, unit cells, are connected in series. When supplied with fuel, each fuel cell stack generates power with an electromotive force of about 100 volts. The fuel cell stacks 10A, 10B, 10C, 10D are connected in series in that order. The fuel cell stack 10A is provided with a reference electrode 13 of an electric potential of zero volts. The fuel cell stack 10D is provided with an output electrode 19 that produces an electric potential difference of about 400 volts with respect to the reference electrode 13.

A cooling construction includes a supply pipe 40 connected to a cooling medium supply opening 201A formed in the supply/discharge box 200 of a fuel cell apparatus 1, and a discharge pipe 42 connected to a cooling medium discharge opening 202A formed in the supply/discharge box 200.

The supply pipe 40 has a mesh member 41 that is disposed near the supply opening 201A so as to contact the cooling medium flowing into the supply opening 201A. The mesh member 41 is formed from an electrically conductive material (e.g., stainless steel or the like). In the discharge pipe 42, a mesh member 44 substantially the same as the mesh member 41 is disposed near the discharge opening 202A so as to contact the cooling medium flowing out of the discharge opening 202A. The mesh member 41 and the mesh member 44 are electrically connected by an electrically conductive line 46. The electrically conductive line 46 is connected to the reference electrode 13 of the fuel cell apparatus 1 via an electrically conductive line 48. The electrically conductive line 46 is grounded via an electrically conductive line 49. Therefore, the mesh member 41, the mesh member 44, and the reference electrode 13 of the fuel cell apparatus 1 are short-circuited and grounded.

Figure 9:
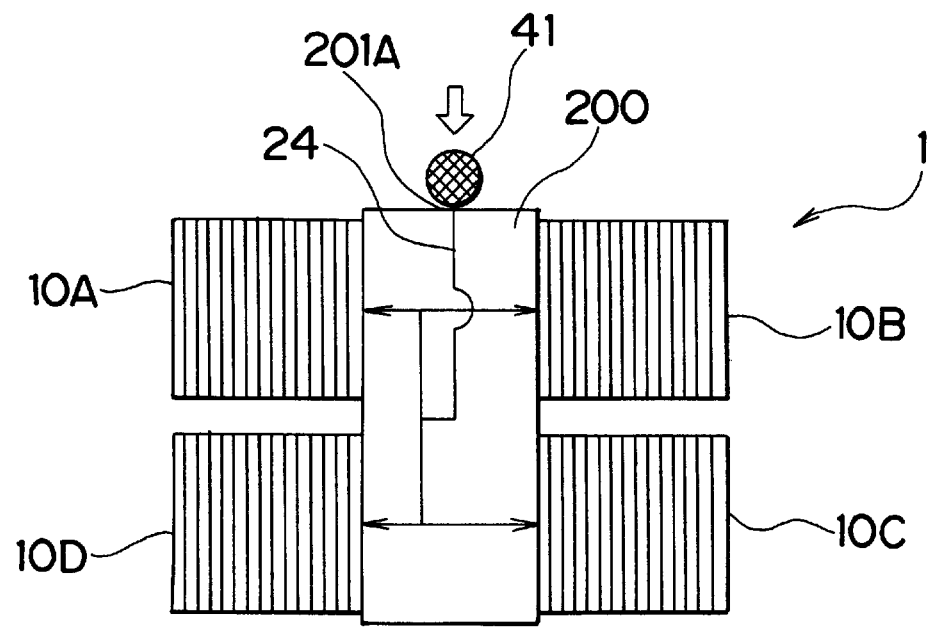
FIG. 9 illustrates still another short circuit construction.
Figure 10:
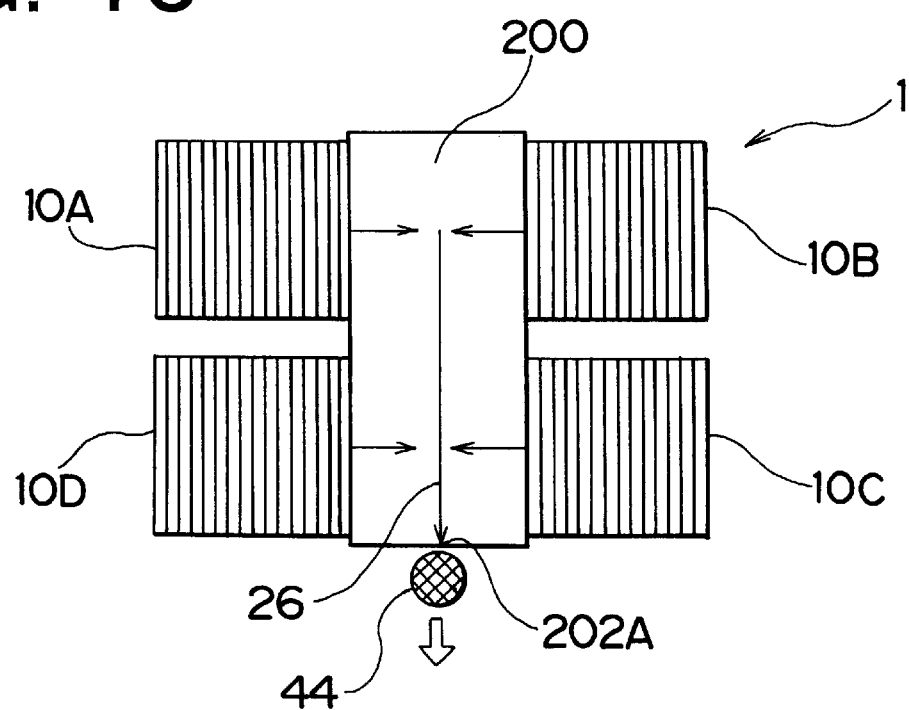
FIG. 10 illustrates a further short circuit construction.

Next, an electrical state of the cooling medium in the above-described cooling construction will be described. Since the electrical state of the cooling medium is greatly affected by the electrical state of the fuel cell apparatus 1, the electrical state of the cooling medium will be described in conjunction with the electrical state of the fuel cell apparatus 1 and, in particular, the electrical state thereof in relation with the cooling medium. FIG. 9 is schematic diagram exemplifying a manner in which the cooling medium supplied into the supply/discharge box 200 of the fuel cell apparatus 1 is supplied to the fuel cell stacks 10A, 10B, 10C, 10D. FIG. 10 is a schematic diagram exemplifying a manner in which the cooling medium discharged from the fuel cell stacks 10A, 10B, 10C, 10D of the fuel cell apparatus 1 into the supply/discharge box 200 is discharged from the supply/discharge box 200.

After flowing into the supply/discharge box 200 via the supply opening 201A, the cooling medium is distributed to the fuel cell stacks 10A, 10B, 10C, 10D via a distributing pipe 24 formed in the supply/discharge box 200, as shown in FIG. 9. Although not shown, the fuel cell stacks 10A, 10B, 10C, 10D have cooling medium channels that extend in a stacking direction in which cells are stacked in series. The cooling medium channels of the stacks are not provided with an insulative coating. Therefore, in the vicinity of the supply opening 201A of the supply/discharge box 200, the cooling medium contacts a cell having an electric potential of about 100 volts relative to the electric potential of the reference electrode 13. The cooling medium discharged from the fuel cell stacks 10A, 10B, 10C, 10D is discharged from the discharge opening 202A via a discharge pipe 26 formed in the supply/discharge box 200. Therefore, in the vicinity of the discharge opening 202A of the supply/discharge box 200, the cooling medium contacts a cell having an electric potential of about 300 volts relative to the electric potential of the reference electrode 13.

Therefore, the cooling medium in the supply/discharge box 200 has an electric potential of about 100 volts near the supply opening 201A, and has an end plate of about 300 volts near the discharge opening 202A, although this is dependent on the electric conductivity of the cooling medium. However, the mesh member 41 disposed in the supply pipe 40 and the mesh member 44 disposed in the discharge pipe 42 are short-circuited by the electrically conductive line 46, and the electrically conductive line 46 is connected to the reference electrode 13 via the electrically conductive line 48, and is grounded via the electrically conductive line 49. Therefore, the cooling medium has an electric potential of zero volts at the mesh member 41 and the mesh member 44. That is, although the cooling medium may have an electric potential gradient between the supply opening 201A and the discharge opening 202A within the supply/discharge box 200, the cooling medium outside the supply/discharge box 200 does not have an electric potential difference, but has an electric potential equal to the electric potential of the grounded reference electrode 13 of the fuel cell apparatus 1. Therefore, it is possible to prevent problems due to an electric potential difference occurring between the cooling medium in the supply pipe 40 and the cooling medium in the discharge pipe 42, for example, corrosion of mechanisms or appliances of the cooling construction, etc.

The above-described cooling construction 5 is able to prevent corrosion of appliances or devices connected to the cooling construction 5 of the embodiment attributed to an electric potential difference in the cooling medium since the mesh member 41 and the mesh member 44 in contact with the cooling medium are short-circuited by the electrically conductive line 46 and therefore the cooling medium does not have an electric potential difference. Furthermore, since the mesh member 41 and the mesh member 44 are connected to the reference electrode 13 of the fuel cell apparatus 1, and is grounded, there is no danger of electric potential leakage via the cooling medium. Still further, since the cooling medium channels extend in the stacking direction in the fuel cell stacks 10A, 10B, 10C, 10D, the cooling construction of the fuel cell apparatus 1 can be simplified, and the fuel cell apparatus 1 can be reduced in size. Further, since no insulative coating is provided for the cooling medium channels, costs can be curbed to a low level.

In the fuel cell apparatus 1 of the third modification, the mesh member 41 and the mesh member 44 are short-circuited, and are connected to the reference electrode 13 of the fuel cell apparatus 1, and are grounded. However, if merely the prevention of corrosion of appliances or devices connected to the cooling construction is intended, the short-circuit between the mesh member 41 and the mesh member 44 will suffice. It is also possible to adopt a construction in which the mesh member 41 and the mesh member 44 are short-circuited, and are connected to the reference electrode 13 of the fuel cell apparatus 1, or a construction in which the mesh member 41 and the mesh member 44 are short-circuited, and are grounded.

In the fuel cell apparatus 1 of the third modification, the mesh member 41 is disposed in the supply pipe 40 and the mesh member 44 is disposed in the discharge pipe 42. However, the members 41, 44 do not need to have a mesh construction, and may have any configuration, as long as the members 41, 44 are formed from an electrically conductive material, and contact the cooling medium.

Although in the fuel cell apparatus 1 of the third modification, the cooling medium channels in the fuel cell stacks 10A, 10B, 10C, 10D are not provided with insulative coatings, the cooling medium channels may be provided with insulative coatings.

Although in the fuel cell apparatus 1 of the third modification, the cooling medium flows in at a position where the electric potential is about 100 volts, and flows out at a position where the electric potential is about 300 volts, the inlet opening and the outlet opening may have any electric potential. The fuel cell apparatus 1 is not limited to a series-connected fuel cell apparatus that generates power with an electromotive force of about 400 volts. The electromotive force of the fuel cell apparatus may be of any value.

While various constructions of the short circuit means have been described above, the short circuit means is not restricted by the foregoing embodiment or modifications, but may also be provided in various other fashions in accordance with the location where an electric potential exists.

C. Drain Mechanism

Figure 11:
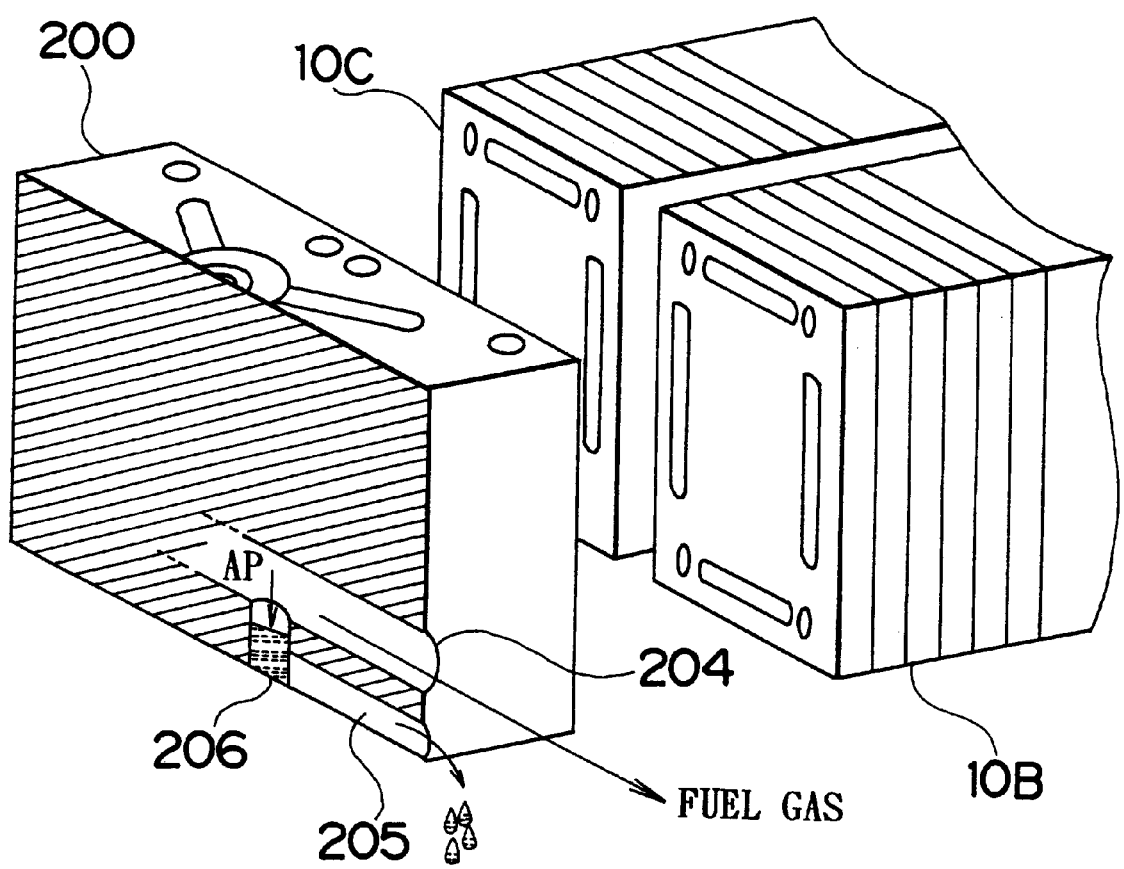
FIG. 11 is a diagram illustrating a drain mechanism provided in a fuel gas discharge opening 204.

FIG. 11 is a diagram illustrating a drain mechanism provided in the fuel gas discharge opening 204, in a cutaway view wherein the supply/discharge box 200 of the embodiment is cut along a plane that includes the fuel gas discharge opening 204. To avoid a complicated illustration, the sectional view portion shows only the discharge opening 204 and its vicinity. As described above, the fuel gas discharged from the stacks 10A–10D is gathered in the supply/discharge box 200, and is discharged out of the discharge opening 204. FIG. 11 shows a channel through which the gas gathered from the stacks 10A–10D flows.

As shown in FIG. 11, the gas channel branches near the discharge opening 204, and a drain port 205 is provided. A channel extending from the branching point to the drain port 205 needs only to be formed so as to allow water to flow, and may be suitably provided at such a position as to avoid interference with other channels formed in the supply/discharge box 200. Although FIG. 11 shows an L-shaped bent channel, the channel may also be curved. In this embodiment, a bent portion of the L-shaped channel serves as a water storage portion to temporarily store water droplets, as described below. The drain channel is provided near the discharge opening 204. The drain channel is provided in such a position that static pressure AP locally raised at a joint portion of the discharge opening 204 with another pipe acts on surfaces of water droplets stored in the water storage portion.

The operation of the drain mechanism will be described below. Since a fuel cell generates power based on equations (1) and (2) presented above, water is produced as a result of the power generation. Furthermore, since this embodiment uses polymer electrolyte fuel cells, it is necessary to appropriately moisturize the electrolyte membrane of each cell in order to generate power. As a result, the fuel gas that has passed through a cell carries a certain amount of water droplets. Since the fuel gas is supplied at relatively high pressure to each cell in the fuel cell apparatus, the droplets are conveyed to the discharge opening 204 due to the gas pressure. However, the thus-generated droplets need to be discharged somewhere in the fuel gas channel. If water droplets remain in the gas channel, there is a possibility that droplets will deposit on an internal surface of the gas channel and will impede the supply and discharge of the fuel gas. The drain mechanism of this embodiment discharges water droplets contained in the discharged gas to the outside.

Water droplets carried to the vicinity of the fuel gas discharge opening 204 enter the drain port-side channel. The bent portion of the L-shaped drain port-side channel serves as a water storage portion 206 to temporarily store water droplets. It is desirable that the drain port-side channel be provided below the gas channel so that water droplets efficiently enter the drain port-side channel due to gravity. The thus-stored water droplets are subsequently discharged out of the drain port 205.

The above-described drain mechanism may be provided at any site in the channel for discharging the fuel gas. For example, the drain mechanism may be provided outside the fuel cell apparatus. However, it is a significant feature of this embodiment that the drain mechanism is provided at a site within the supply/discharge box 200 downstream of a site of collecting the gas from the stacks 10A–10D. The selection of such a site makes it possible for a single drain mechanism to efficiently discharge water droplets. Furthermore, since the provision of only a single drain mechanism suffices, the apparatus construction can be simplified, and can be reduced in size. Furthermore, since the drain mechanism is provided inside the supply/discharge box 200, it becomes unnecessary to provide a drain valve or the like outside the supply/discharge box 200, and it becomes possible to further reduce the size of the apparatus.

The drain mechanism of this embodiment utilizes the pressure of the fuel gas as well as gravity, thereby achieving an advantage of efficiently discharging water droplets. As described above, the water storage portion 206 is provided within the drain channel in this embodiment, and the drain channel is designed so that the gas pressure AP acts on surfaces of water droplets stored in the water storage portion 206. Since the fuel gas is supplied at high pressure to each stack, the discharged fuel gas normally has a pressure that is higher than atmospheric pressure. Therefore, by allowing the gas pressure to act on surfaces of water droplets stored in the water storage portion 206, it becomes possible to actively and efficiently discharge water. Since drainage is performed by using the gas pressure as well, the diameter of the drain port 205 can be reduced, and the size of the apparatus can be reduced.

Although this embodiment adopts a construction in which a branch channel is provided near the gas discharge opening 204 so as to allow the static pressure AP to act on the water storage portion 206 for efficient drainage, the position and shape of the branch channel may be realized in various fashions that allow the gas pressure to act on the water storage portion 206. For example, the branch channel may be provided at a site in a curved portion of the gas channel where pressure becomes locally high. Furthermore, the branch channel may be joined to the gas channel at an acute angle with respect to the direction of flow of the discharged gas, so that the dynamic pressure of the gas acts on the branch channel. Of course, it is not essential to adopt a construction that utilizes gas pressure, that is, it is possible to adopt a drain construction that utilizes only gravity.

Figure 12:
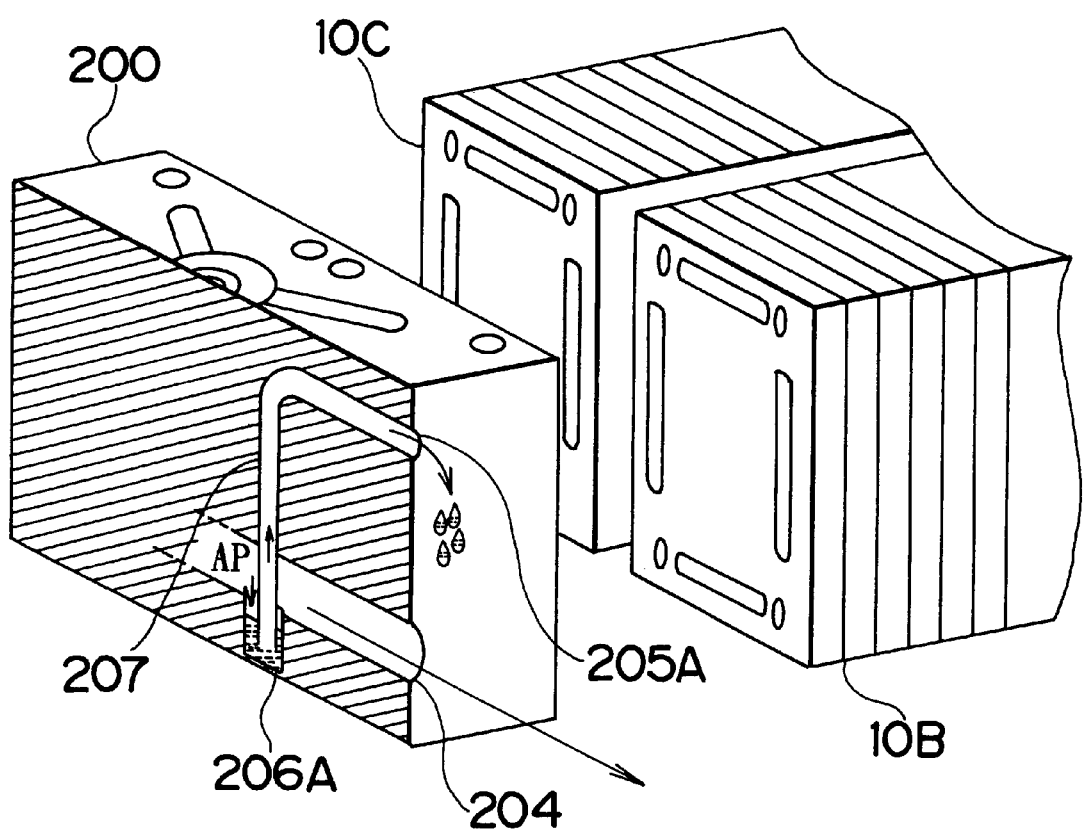
FIG. 12 illustrates a modified drain mechanism.

The use of gas pressure for drainage also achieves an advantage of increasing the degree of freedom regarding the position of the drain port. A drain port that exploits this advantage will be described as a modification. FIG. 12 illustrates a drain mechanism as a modification. This modification differs from the embodiment in that the drain port is provided above the discharge opening 204. As shown in FIG. 12, a channel extending to a drain port 205A branches from the gas discharge channel at a branching site that is similar to that in the embodiment. The branching portion is provided below the gas discharge channel as in the embodiment. The branching portion forms a water storage portion 206A. In the modification, a drain channel 207 that has an opening in the water storage portion 206A extends to the drain port 205A. When the pressure AP of the discharged gas, which is higher than atmospheric pressure, acts on surfaces of water in the water storage portion 206A, water is discharged out of the drain port 205A via the drain channel 207. Thus, the provision of the water storage portion 206A at such a site that the portion receives the gas pressure makes it possible to provide the drain port 205A at an arbitrary site. Therefore, the degree of freedom with regard to the position of the drain port 205A increases, so that a size reduction of the whole apparatus can be pursued. As in the embodiment, the water storage portion 206A in the modification may be provided in various fashions that allow the gas pressure to act on the water storage portion.

Although FIGS. 11 and 12 illustrate the drain mechanisms with regard to the fuel gas discharge portion, it is also necessary to perform drainage with respect to the oxidative gas. In this embodiment, the oxidative gas channel is provided with a drain mechanism that is similar to the drain mechanism for the fuel gas channel. A mechanism of the modification (FIG. 12) may be applied to the oxidative gas channel drain mechanism.

D. Tension Plate Insulating Construction

Figure 13:
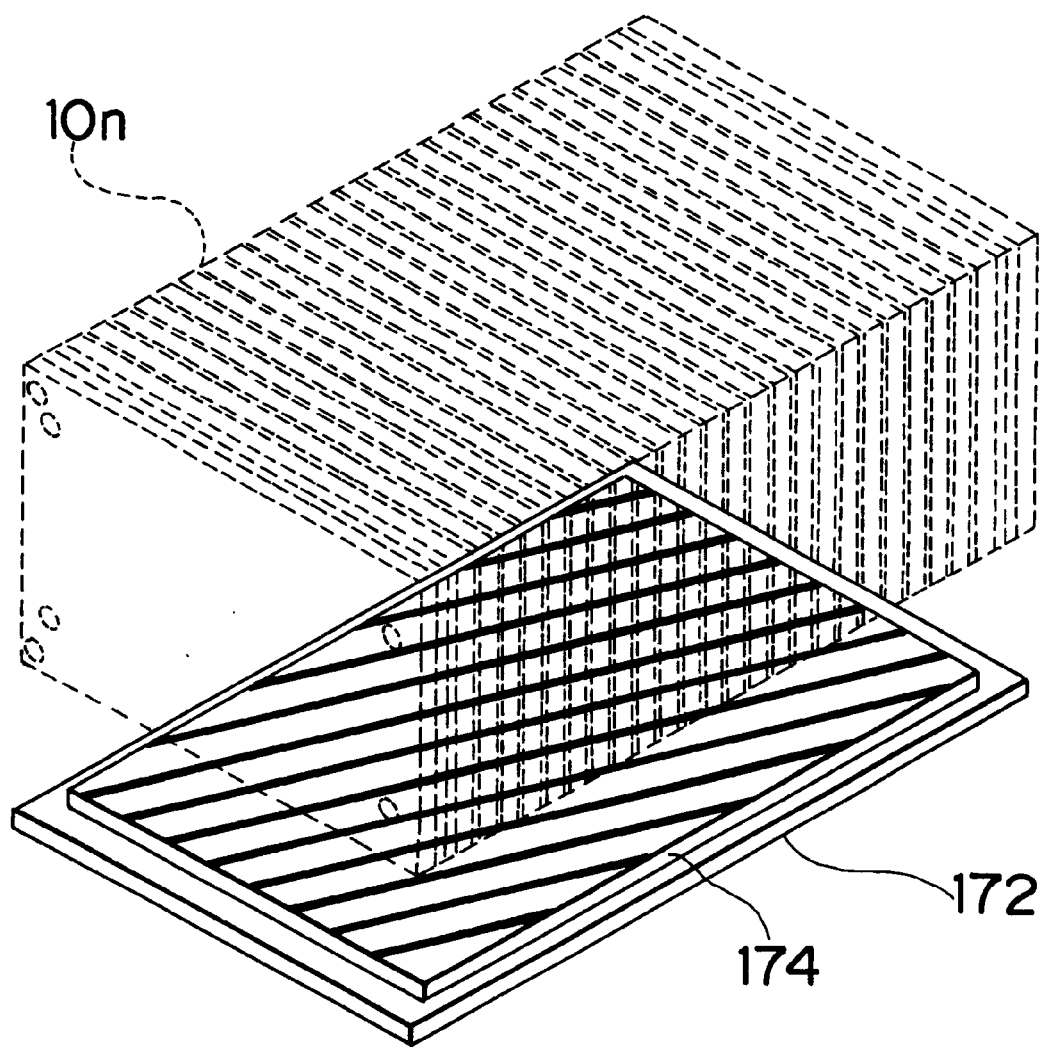
FIG. 13 illustrates a construction of a tension plate.

FIG. 13 illustrates a construction of a tension plate. Of the tension plates shown in FIG. 1, only the tension plate 172 provided on the lower surface of the narrow-definition stack 10n is shown in FIG. 13. The tension plate 170 provided on the upper surface of the stack has the same construction as the tension plate 172, and therefore is not illustrated in the drawings nor will be described below.

The tension plate 172 has an electrically insulating layer 174 on a surface that contacts the narrow-definition stack formed by stacking cells. In this embodiment, the insulating layer 174 is formed by adhering a silicone rubber sheet to the tension plate 172. The material of the insulating layer 174 is not limited to a silicone rubber sheet, but may also be various other materials that achieve electrical insulation. If a silicone rubber sheet is used, an advantage of isolating the narrow-definition stack 10n from vibrations, in addition to electrical insulation, is achieved. If there is no need to provide an insulating member between the narrow-definition stack 10n and the tension plate 172, for example, if the tension plate 172 is formed from an electrically insulative material, it is also possible to provide the insulating layer 174 as an anti-vibration layer only for the purpose of controlling vibrations. The attachment of insulating layer 174 to the tension plate 172 maybe achieved by coating or the like, instead of adhesion. Thus, as for the insulating layer 174, various materials and forming methods are used in accordance with the intended effect of the layer, that is, electrical insulation and/or vibration control.

The use of the tension plate 172 in this embodiment achieves an advantage of simplifying the production process of a stack 10. For example, if an insulating layer 174 is separately provided, it becomes necessary to add a step of inserting an insulating member between a narrow-definition stack 10n and a tension plate. However, if the tension plate 172 in this embodiment is used, this step can be omitted. Since the process of forming a stack 10 by stacking cells is a precision process that greatly affects the performance of the fuel cell apparatus, simplification of this process leads to a considerable improvement in productivity.

Furthermore, the integral formation of the insulating layer 174 with the tension plate 172 advantageously allows a size reduction of the stack 10 for reasons stated below. First, if an insulating member is prepared as a separate member, the insulating member tends to have an increased thickness for the purpose of retaining the shape of the member. However, since the insulating layer 174 is formed integrally with the tension plate 172 in this embodiment, the embodiment makes it possible to reduce the thickness of the insulating layer 174, and also makes it possible to curb the dimensional error in thickness. Second, if an insulating member is separately prepared, it is necessary to provide a sufficiently large clearance between the narrow-definition stack 10n and the tension plate 172 so that should the insulating member shift in position, the tension plate 172 will not contact the narrow-definition stack 10n. However, since the insulating layer 174 is formed integrally with the tension plate 172 in the embodiment, the embodiment eliminates the need for such consideration, and allows the clearance therebetween to be reduced.

Due to these advantages, the use of the tension plate 172 described above in conjunction with the embodiment makes it possible to reduce the stack 10, that is, reduce the whole fuel cell apparatus, in size.

Although the foregoing description is made in conjunction with the construction (see FIG. 1) in which the tension plates 170, 172 are disposed above and below the stack 10, the integral formation of an insulating layer with a tension plate is applicable to various constructions, for example, a construction in which stacks 10 are completely housed in a box-shaped case, a construction in which four side surfaces of each stack 10 are fixed by plates, etc.

E. Cell Securing Construction And Stack Arrangement

Figure 14A:
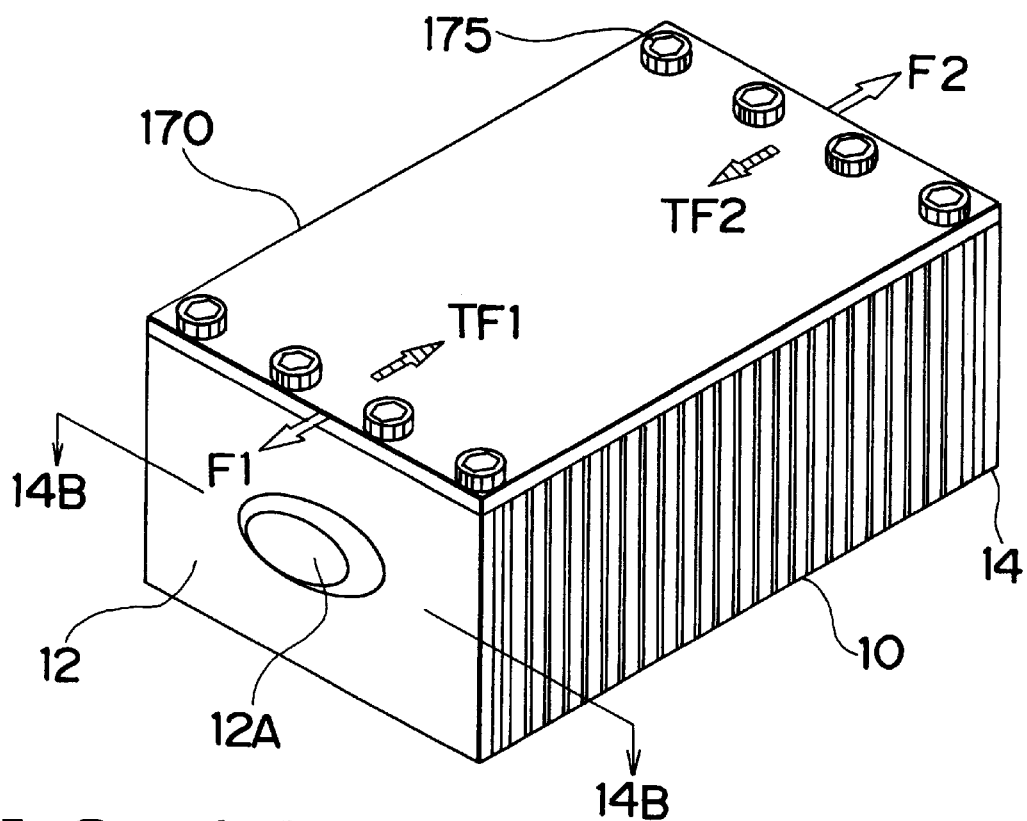
FIGS. 14A and 14B illustrate a construction for securing cells.
Figure 14B:
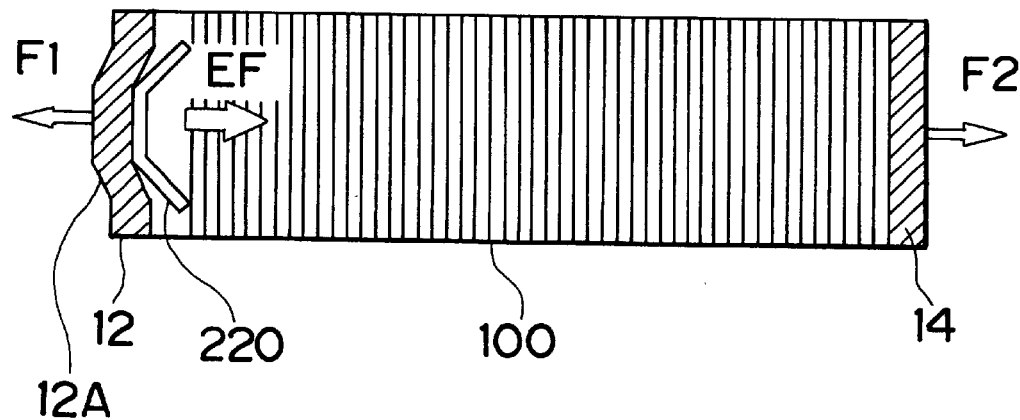

FIGS. 14A and 14B illustrate a construction for securing cells. As described above, each stack 10 is secured by clamping it with the tension plates 170, 172 from above and below. The securing method will be described in detail.

FIG. 14A is a perspective view of the stack 10 viewed from a side of the end plate 12. As shown in FIG. 14A, the end plates 12, 14 of the stack 10 are fastened to the tension plate 170 by eight bolts 175 inserted in a vertical direction in the drawing. Although not shown in the perspective view of FIG. 14A, the tension plate 172 is also fastened by eight bolts inserted in the vertical direction. The end plate 12 has, around its center, a protrusion 12A.

FIG. 14B is a sectional view taken on line 14B-14B in FIG. 14A. As described above, the stack 10 is formed by stacking many cells 100. The stacked cells 100 are secured by sandwiching the stack from opposite ends thereof with the end plates 12, 14. A disc spring 220 is disposed between an end of the stacked cells 100 and the end plate 12. A central portion of the end plate 12 is deformed into a saucer shape so as to prevent the disc spring 220 from shifting in position. The protrusion 12A is an external appearance of the saucer-shaped recess. The disc spring 220 is disposed so as to apply an elastic force EF to the cells 100 in such a direction that the cells 100 are brought into close contact with one another.

In response to the elastic force applied to the cells 100 by the disc spring 220, the reaction forces F1, F2 act on the end plates 12, 14. In this embodiment, the tension plates 170, 172 fixed to the upper and lower sides of the stack 10 apply to the end plates 12, 14 elastic forces TF1, TF2 that counterbalance the reaction forces F1, F2, thereby holding the entire construction. A material and a plate thickness of the end plates 12, 14 are selected such that the end plates 12, 14 maintain a sufficient rigidity against the aforementioned elastic forces.

The advantages of the above-described construction are as follows. Since the cells 100 are held in close contact with one another by the elastic force EF from the disc spring 220, the internal resistance attributed to the gaps between cells and the like can be reduced. Although the cells 100 deform due to heat during power generation, the disc spring 220 absorbs such deformation, and holds the cells 100 in close contact. Therefore, the fuel cell apparatus of this embodiment is able to constantly perform stable power generation. The elastic force and the size of the disc spring 220 may be suitably selected so that the aforementioned advantages are fully realized.

Furthermore, since the tension plates 170, 172 and the end plates 12, 14 are fastened by the bolts inserted in the vertical direction in FIGS. 14A, that is, a direction perpendicular to the stacking direction of the cells 100, the apparatus can be advantageously reduced in size as described below. First, since the bolts are inserted in the aforementioned direction, protrusion of a bolt head in the stacking direction can be avoided, and the size of the stack 10 in the stacking direction can be correspondingly reduced. Since a plurality of cells are stacked to provide a voltage, the stack 10 normally has an increased dimension in the stacking direction. If the fuel cell apparatus is installed in an appliance such a vehicle or the like, a severe requirement regarding the dimension in the stacking direction is often imposed. Therefore, the aforementioned size reduction in the stacking direction is significant.

Furthermore, the fuel cell apparatus of this embodiment is constructed by connecting the four stacks 10A–10D to the supply/discharge box 200 as shown in FIG. 1. If in each stack, the bolts securing the cells are protruded in the stacking direction, the bolts interfere with the supply/discharge box 200, and therefore it becomes necessary to provide a construction for avoiding the interference. As a result, the size of the whole fuel cell apparatus may increase and the construction of the supply/discharge box 200 may become complicated. However, the stacks 10A–10D in this embodiment can be connected to the supply/discharge box 200 without interference with the bolts. Thus, the construction can be simplified, and can be reduced in size.

Figure 15:
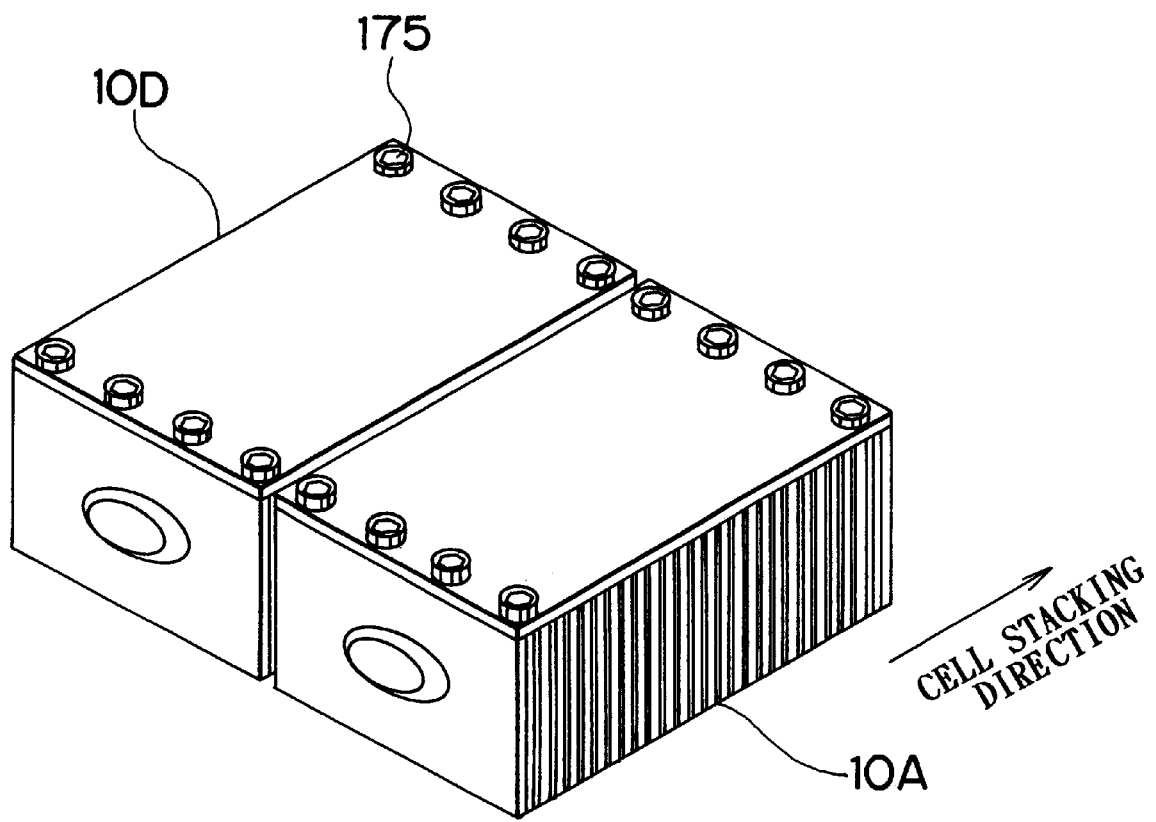
FIG. 15 illustrates an arrangement of stacks according to the embodiment.

The aforementioned advantages are achieved by inserting the bolts in a direction perpendicular to the stacking direction. In this embodiment, a further size reduction of the apparatus is pursued by contriving the arrangement of the plurality of stacks. FIG. 15 illustrates an arrangement of stacks in this embodiment. The fuel cell apparatus of this embodiment is constructed by connecting the four stacks 10A–10D to the supply/discharge box 200. An arrangement of the stacks 10A, 10D are shown in FIG. 15. The stacks 10B, 10C are placed in an arrangement similar to the arrangement of the stacks 10A, 10D.

Figure 16A:
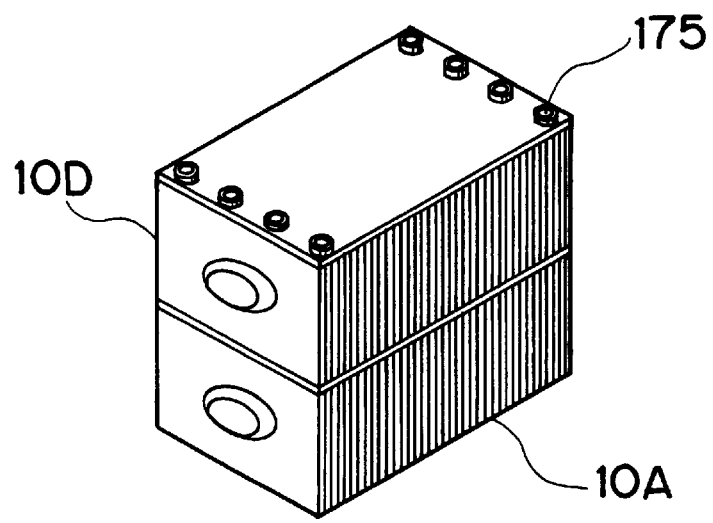
FIGS. 16A and 16B illustrate a state where stacks are arranged in a direction of insertion of bolts 175.
Figure 16B:
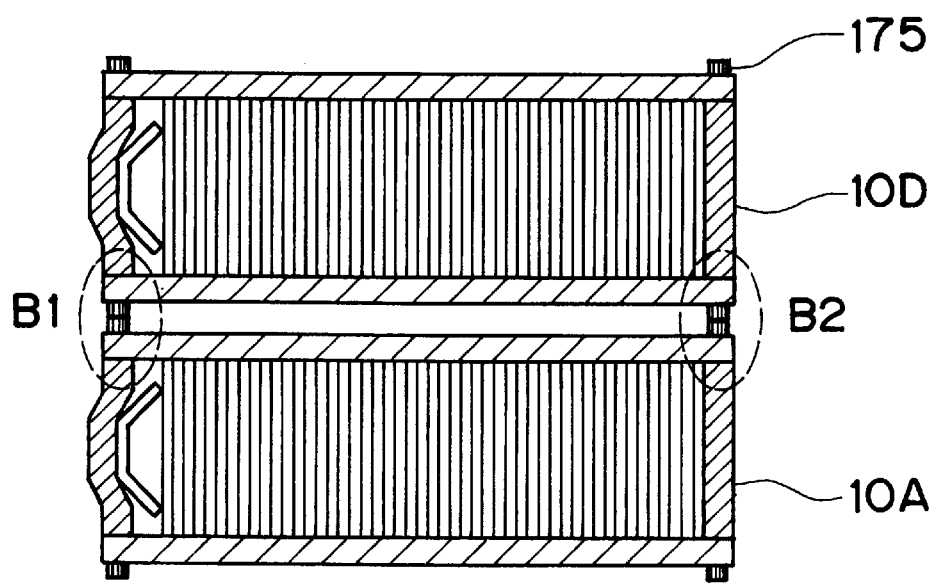

As shown in FIG. 15, the two adjacent stacks 10A, 10D in this embodiment are arranged in a direction perpendicular to the direction of insertion of the bolts 175. Due to this arrangement, it becomes possible to arrange the stacks 10A, 10D in a packed fashion, without interference between the bolts 175. Therefore, a size reduction of the entire fuel cell apparatus can be achieved. FIGS. 16A and 16B illustrate a state where the stacks are arranged in the insertion direction of the bolts 175. FIG. 16A is a perspective view, where the stack 10D is placed on top of the stack 10A. FIG. 16B is a side view of the arrangement shown in FIG. 16A. If stacks are disposed in a vertical arrangement, the bolts 175 of the stacks 10A, 10D interfere with each other in regions B1, B2 between the stacks 10A, 10D as shown in FIG. 16B. Therefore, the stack 10A and the stack 10D cannot be disposed in close contact, and a size increase results. In contrast, if the stacks 10A, 10D are arranged in a direction perpendicular to the insertion direction of the bolts 175, the gap therebetween can be reduced.

The arrangement of the stacks 10A, 10D is not limited to an arrangement as shown in FIG. 15 in which the cell stacking direction of the stack 10A is parallel to the cell stacking direction of the stack 10D, but may be any arrangement as long as interference between the bolts 175 of the two stacks is avoided. For example, the stacks 10A, 10D may be disposed side by side in the cell stacking direction.

Figure 17:
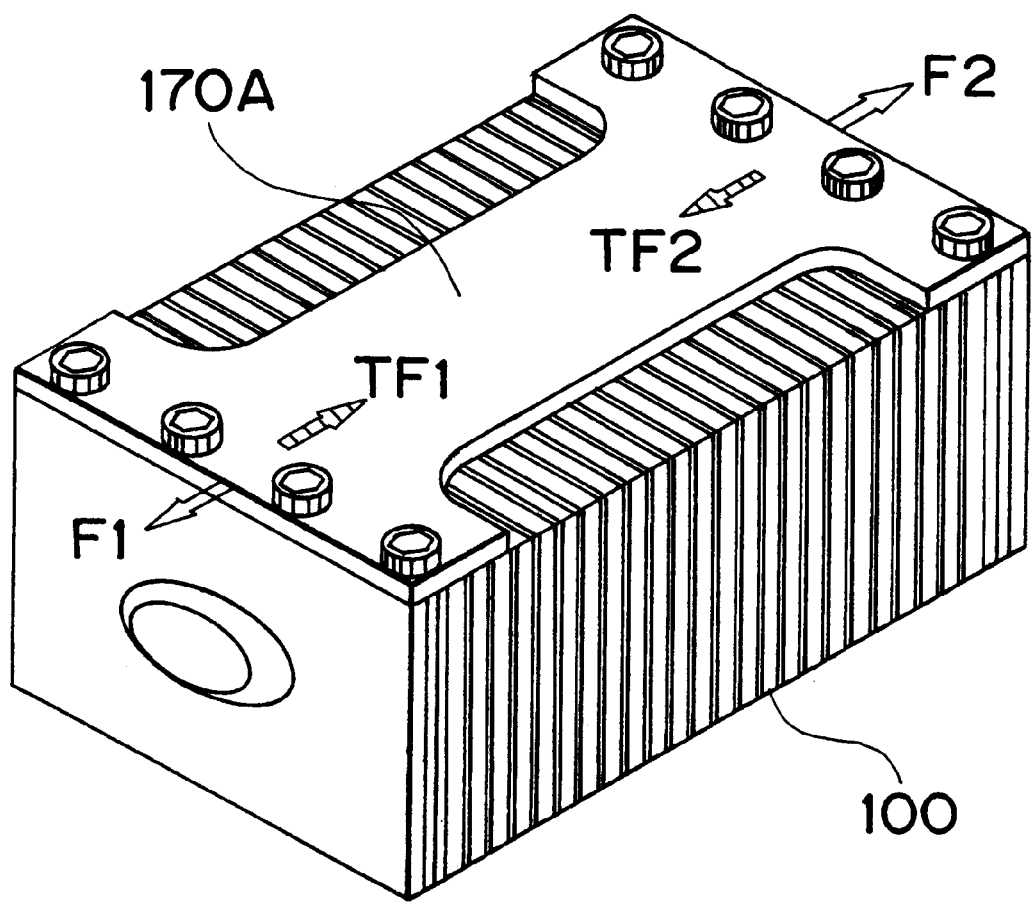
FIG. 17 illustrates a modification of the tension plate.

Although in the embodiment, the tension plate 170 is formed by a rectangular plate, the shape of the tension plate 170 is not limited to a rectangle. FIG. 17 illustrates a modification of the tension plate. A tension plate 170A according to the modification has a letter-H shape, that is, opposite end portions of the tension plate 170A to be connected to end plates have an increased width, and a middle portion has a reduced width. The tension plate 170A having this shape is able to apply elastic forces TF1, TF2. Therefore, the tension plate 170A can be used as a component part of a stack. When the cells 100 are thermally deformed, the deformation of the tension plate caused by tensile loads F1, F2 applied thereto via the end plates is greater in the modification than in the embodiment. That is, in addition to the disc spring, the tension plate 170A in the modification absorbs thermal deformation of the cells 100. Therefore, an excess or insufficient elastic force of the disc spring can be offset by the tension plate 170A. As a result, the range of selection of a disc spring is expanded, and the production cost of the fuel cell apparatus can be reduced. The tension plate 170 is not limited to the configurations exemplified above. Tension plates of various plate thicknesses and shapes may be used in accordance with elastic force requirements.

In the embodiment and the modification, the end plates sandwiching the cells via the disc spring are supported by the tension plates disposed on the upper and lower side faces of the cells. A first feature of the embodiment is that the tension plate-fastening bolts are inserted in a direction perpendicular to the cell stacking direction. As long as the bolts are inserted in the aforementioned direction, it is possible to adopt various constructions, for example, a construction in which tension plates are provided in the right-to-left direction, a construction in which tension plates are provided on four side faces of stacked cells, that is, upper, lower, right and left side faces, etc. Furthermore, if a sufficient rigidity between the end plates and the tension plates can be secured, stacked cells may be secured only to a single tension plate provided on one of the upper, lower, right and left side faces of stacked cells. Still further, although in the embodiment and the modification, the tension plates are fastened through the use of bolts, the fastening members are not limited to bolts. Further, the member for applying an elastic force is not limited to a disc spring, but may also be various other springs, rubber sheets, etc.

F. Outer Case

Figure 18A:
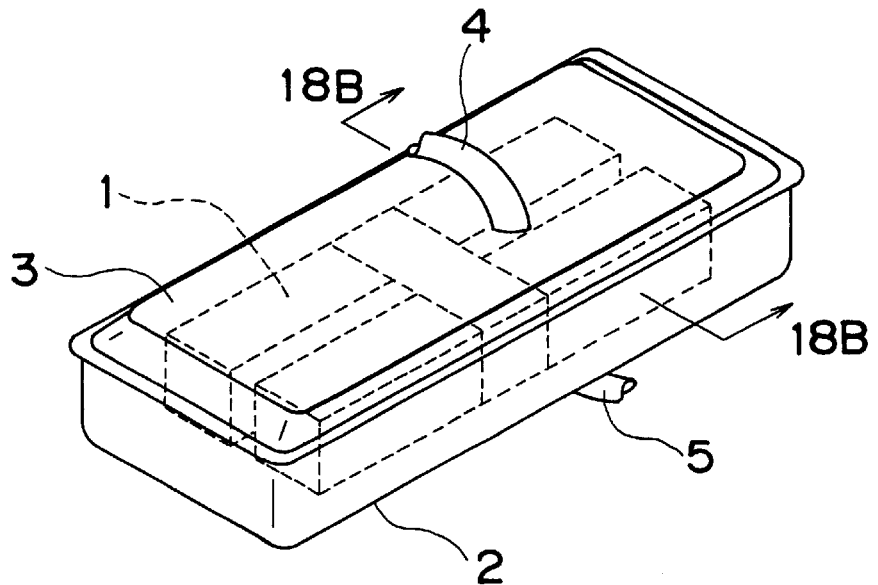
FIGS. 18A and 18B illustrate a fuel cell apparatus housed in an outer case.
Figure 18B:
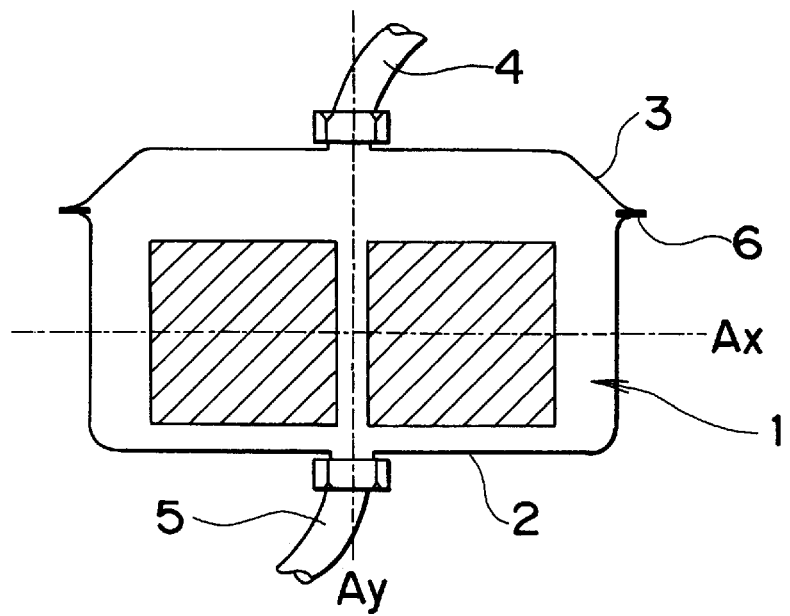

As described above in conjunction with the overall construction, the fuel cell apparatus 1 of this embodiment is housed in an outer case. FIGS. 18A and 18B illustrate a fuel cell apparatus housed in an outer case. FIG. 18A is a perspective view of the fuel cell apparatus 1 housed in the outer case, wherein the fuel cell apparatus 1 is indicated by broken lines. As shown in FIG. 18A, the outer case is formed by a body 2 and a lid 3. A drain hose 5 is connected to the body 2. An exhaust hose 4 is connected to the lid 3. Although pipes for supplying the fuel gas, the oxidative gas, and the cooling water to and discharging them from the fuel cell apparatus 1 are joined to the outer case, those pipes are omitted from the drawing in order to avoid a complicated illustration.

FIG. 18B is a sectional view taken on plane 18B—18B in the perspective view of FIG. 18A. In FIG. 18B, hatched portions correspond to the fuel cell apparatus 1. The body 2 and the lid 3 of the outer case are sealed at their joint surfaces by a seal 6. In this embodiment, the outer case is tightly sealed in order to prevent penetration of foreign substances, such as water, dust, etc., into the fuel cell apparatus 1. Although in the embodiment, the seal 6 is formed from a silicone rubber, various materials and methods may be used to seal the outer case as long as they fit the intended purpose. For example, the body 2 and the lid 3 may be welded, or the body 2 and the lid 3 may be fixed by, for example, swaging, caulking or a like method.

The drain hose 5 is a hose for draining water that is accumulated in the outer case for any cause. The drain hose 5 is fixed by a retainer to a hole formed in a lower portion of the body 2. The exhaust hose 4 is a hose for discharging various gasses accumulated in the outer case. The exhaust hose 4 is fixed by a retainer to a hole formed in an upper portion of the lid 3. The drain hose 5 and the exhaust hose 4 are constructed so as to control entrance of foreign substances, such as water, dust, etc. In this embodiment, these hoses are provided with sufficiently great lengths, and are suitably bent, so as to achieve such effects. In order to further reliably prevent entrance of foreign substances, a valve body may be provided in a mounting portion of each hose. The drain hose 5 and the exhaust hose 4 are not essential for the outer case. If the need for the hoses is low, for example, if the possibility of production of water or various gasses from the fuel cell apparatus in the outer case is low, it is possible to omit at least one of the hoses.

The outer case achieves the following advantages. First, housing the fuel cell apparatus 1 in the outer case prevents entrance of foreign substances. Therefore, a power generation efficiency reduction due to entrance of a foreign substance between cells can be avoided. Furthermore, if the outer case is used, the fuel cell apparatus 1 itself does not need to have a protection against entrance of foreign substances, for example, complete coating of the outer surfaces. Therefore, the overall construction can be simplified, and the size of the cell stack cells can be reduced. Furthermore, the productivity of the fuel cell apparatus can be improved, and the production cost can be reduced.

The outer case also achieves an advantage of securing rigidity without causing a weight increase nor a size increase of the fuel cell apparatus. In FIG. 18B, axes Ax, Ay indicate neutral axes regarding bending deformation in the vertical direction and the right-left direction. In order to construct a fuel cell apparatus 1 while securing sufficient rigidity, it is desirable to sufficiently increase the second moments of area with respect to the neutral axes Ax, Ay. It should be noted herein that the fuel cell apparatus itself generally has small dimensions from the neutral axes Ax, Ay to the outer surfaces thereof, and therefore the second moments of area are smaller in the fuel cell apparatus than in the outer case. Therefore, if the outer case is not used, it becomes necessary to increase the plate thicknesses of the fuel cell apparatus 1 and, in particular, the plate thickness of the tension plates, in order to secure a sufficient bending rigidity. In contrast, the outer case provides large second moments of area since the distances from the neutral axes Ax, Ay to the outer surfaces of the outer case are sufficiently great. Therefore, even a relatively small plate thickness can secure sufficient bending rigidity. If the outer case has a sufficient bending rigidity, the fuel cell apparatus 1 receives substantially no bending load, so that the plate thicknesses of the fuel cell apparatus 1 can be reduced.

The loads applied to the fuel cell apparatus 1 include a torsional load, besides the aforementioned bending load. In order to secure sufficient rigidity for the torsional load, it is desirable to increase the polar moment of area with respect to a center axis of torsion, that is, the point of intersection of the neutral axes Ax, Ay in FIG. 18B. The polar moment of area increases with increases in the distance from the center axis to the outer surface. Therefore, if the outer case is used, a larger polar moment of area is achieved than if an outer case is not used. Therefore, the outer case can achieve sufficient torsional rigidity while having a relatively small plate thickness. If the outer case has sufficient torsional rigidity, the fuel cell apparatus 1 receives substantially no torsional load, so that the plate thicknesses of the fuel cell apparatus 1 can be reduced.

Due to these effects, the use of the outer case readily secures sufficient rigidity, so that the plate thicknesses of the fuel cell apparatus 1 can be reduced. Therefore, the fuel cell apparatus 1 can be reduced in weight and size. When the outer case is used, the total volume of the apparatus becomes greater than that of the fuel cell apparatus without the outer case. However, in a typical construction, it is necessary to provide a predetermined space around the fuel cell apparatus 1 for the piping for supplying and discharging the fuel gas, the oxidative gas, and the cooling water. Therefore, by disposing the piping within the outer case, the detriment of increasing the total apparatus volume can be eliminated or minimized.

Figure 19:
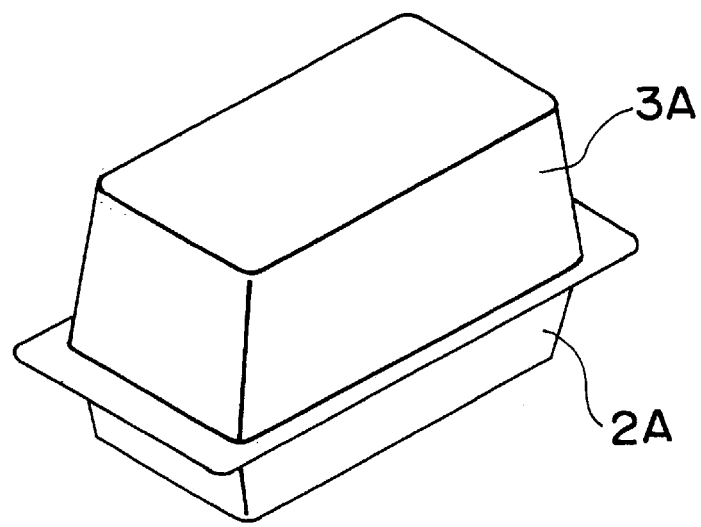
FIG. 19 is a perspective view of an outer case according to a first modification.

The outer case is not limited to the configuration shown in FIGS. 18A and 18B, but may also be formed with various other configurations. FIG. 19 is a perspective view of a first modification of the outer case. In the embodiment, the fuel cell apparatus 1 is substantially completely housed within the body 2, and the lid 3 is placed thereon. In the modification, a body 2A has a relatively reduced size, and a lid 3A has a relatively increased size. For example, let it be assumed that a fuel cell apparatus is to be housed in an outer case, together with a piping arrangement for the fuel gas, the oxidative gas, the cooling water, etc. According to the modification, a large portion of the fuel cell apparatus is exposed when the apparatus is housed in the body 2A but the lid 3A is not placed yet. Therefore, the piping can be easily and reliably connected. As for the dimensions of the body and the lid, it is not necessary that one of the body and the lid be larger than the other, as in the embodiment and the first modification, that is, the body and the lid may have substantially the same size.

Figure 20:
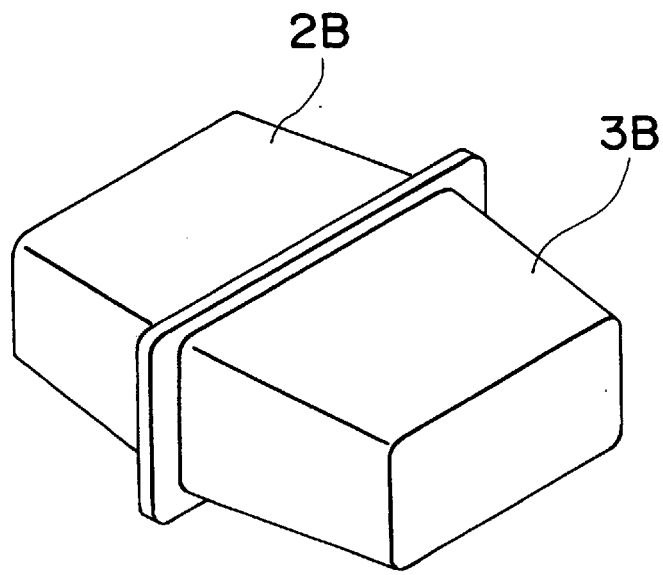
FIG. 20 is a perspective view of an outer case according to a second modification.

FIG. 20 is a perspective view of an outer case according to a second modification. In the embodiment and the first modification, the outer case is formed by the two components, that is, the body and the lid; in other words, the outer case is formed by joining the upper and lower split members. The outer case is not limited to such a construction, but may also have, for example, a construction in which right and left split members are joined. This construction corresponds to the second modification. The outer case is not limited to the above-described constructions, but may have any other construction as long as the construction prevents penetration of foreign substances, such as water, dust, etc., into the fuel cell apparatus housed in the outer case, and is suitable to secure rigidity.

Of course, the outer case may be designed only for the purpose of preventing penetration of foreign substances if the installation condition of the fuel cell apparatus does not require such high rigidity. Under such circumstances, a relatively small outer case may be used. Furthermore, since high rigidity is not required, the outer case may be formed of resin.

The above-described fuel cell apparatus of the embodiment achieves various advantages. First, due to the short circuit construction of the cooling system, the apparatus is able to substantially eliminate detrimental effects attributed to electric potential difference in the cooling water. Second, due to the drain mechanism, the apparatus avoids a power generation failure and unstable operation attributed to what is generally-termed flooding. Third, due to the tension plate insulting construction, it is possible to improve efficiency in production of the fuel cell apparatus. Fourth, due to the cell securing construction and the stack arrangement, it is possible to apply an appropriate elastic force to the cells and avoid a cell stacking failure. Fifth, due to the use of the outer case, it is possible to avoid penetration of foreign substances into the fuel cell apparatus. Furthermore, due to constructions intended to reduce the apparatus size, the fuel cell apparatus achieves the above-stated advantages. Therefore, the embodiment considerably improves the practical utility of the fuel cell apparatus for installation in various appliances.

Although in the foregoing embodiment, all five features described above, that is, the short circuit construction of the cooling system, the drain mechanism, the tension plate insulating construction, the cell securing construction and the stack arrangement, and the outer case, are provided, it is also possible to apply each of the features separately. That is, in accordance with the problems to be solved by the fuel cell apparatus, suitable features may be selectively applied. While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. A fuel cell apparatus comprising:
   at least two cell stacks, each of said cell stacks being formed by stacking unit cells in a stacking direction;
   a cooling mechanism having a cooling passage extending in the stacking direction of the unit cells in each of the at least two cell stacks to pass a cooling medium through each of the at least two cell stacks, the cooling mechanism having a supply opening for supplying the cooling medium to the cooling passage, wherein at least a portion of the cooling medium supplied to the cooling passage in each cell stack is supplied through the supply opening, and a discharge opening for discharging the cooling medium from the cooling passage, wherein at least a portion of the cooling medium discharged from the cooling passage in each cell stack is discharged through the discharge opening; and
   a short circuit device mounted to electrically short-circuit the supply opening and the discharge opening.

2. The fuel cell apparatus of claim 1, wherein said short circuit device comprises a conductive cable.

3. A fuel cell apparatus according to claim 1, wherein the short circuit device is electrically grounded.

4. A fuel cell apparatus according to claim 3, wherein the short circuit device is electrically connected to a reference electrode of the fuel cell apparatus.

5. A fuel cell apparatus according to claim 4, wherein the reference electrode of the fuel cell apparatus, having the short circuit device electrically connected thereto, has an electric potential of zero volts.

6. A fuel cell apparatus according to claim 5, wherein the short circuit device comprises:
   a first member formed from an electrically conductive material, the first member being disposed at the supply opening so as to contact the cooling medium;
   a second member formed from an electrically conductive material, the second member being disposed at the discharge opening so as to contact the cooling medium; and
   member connection means for electrically interconnecting the first member and the second member.

7. A fuel cell apparatus according to claim 6, wherein the first member and the second member are meshed.

8. A fuel cell apparatus according to claim 1, wherein the short circuit device is electrically connected to a reference electrode of the fuel cell apparatus.

9. A fuel cell apparatus according to claim 1, wherein the short circuit device comprises:
   a first member formed from an electrically conductive material, the first member being disposed at the supply opening so as to contact the cooling medium;
   a second member formed from an electrically conductive material, the second member being disposed at the discharge opening so as to contact the cooling medium; and
   a connection member that electrically interconnects the first member and the second member.

10. A fuel cell apparatus according to claim 9, wherein the first member and the second member are meshed.

* * * * *